United States Patent
Cho

(10) Patent No.: US 10,936,142 B2
(45) Date of Patent: Mar. 2, 2021

(54) METHOD AND ELECTRONIC APPARATUS FOR DISPLAYING INFORMATION

(71) Applicant: Samsung Electronics Co., Ltd., Suwon-si (KR)

(72) Inventor: Hyo-young Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/900,068

(22) Filed: Feb. 20, 2018

(65) Prior Publication Data
US 2018/0260080 A1 Sep. 13, 2018

(30) Foreign Application Priority Data
Mar. 13, 2017 (KR) .................. 10-2017-0031353

(51) Int. Cl.
| | | |
|---|---|---|
| *G06F 3/048* | (2013.01) | |
| *G06F 3/0481* | (2013.01) | |
| *G06F 3/0488* | (2013.01) | |
| *G06F 3/0484* | (2013.01) | |
| *G06F 1/16* | (2006.01) | |

(52) U.S. Cl.
CPC ............ *G06F 3/0481* (2013.01); *G06F 1/163* (2013.01); *G06F 3/0488* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 2014/0347289 A1 | 11/2014 | Suh et al. | |
| 2015/0061997 A1* | 3/2015 | Chi | G06F 3/014 345/156 |
| 2015/0378320 A1* | 12/2015 | Knight | G04G 13/026 368/107 |
| 2016/0077684 A1* | 3/2016 | Liu | G06F 3/04847 715/765 |
| 2016/0360344 A1 | 12/2016 | Shim et al. | |

(Continued)

FOREIGN PATENT DOCUMENTS

| | | |
|---|---|---|
| EP | 3 321 748 A1 | 5/2018 |
| KR | 10-2008-0023891 A | 3/2008 |

(Continued)

OTHER PUBLICATIONS

Extended European Search Report dated Sep. 24, 2019, issued in European Application No. 18767739.8.

*Primary Examiner* — William C Trapanese
(74) *Attorney, Agent, or Firm* — Jefferson IP Law, LLP

(57) ABSTRACT

A method and an electronic apparatus for displaying various types of information on a clock graphical user interface (GUI) are provided. The electronic apparatus includes a transceiver configured to obtain time information related to an operation of an external device, at least one processor configured to generate a clock GUI displaying the time information, and a display displaying the clock GUI. The clock GUI includes an indication area and an indication object moving on the indication area. The indication object rotates with respect to a center point included in the indication area, and indicates the time information by indicating an area from among partial areas included in the indication area.

22 Claims, 14 Drawing Sheets

(56) References Cited

U.S. PATENT DOCUMENTS

| | | | |
|---|---|---|---|
| 2017/0031534 A1 | 2/2017 | Singh et al. | |
| 2017/0163438 A1* | 6/2017 | Gary, Jr. | ............. H04L 12/2818 |
| 2017/0329477 A1* | 11/2017 | Sachidanandam | ..... G04G 13/02 |
| 2018/0188925 A1 | 7/2018 | Na et al. | |
| 2018/0196396 A1 | 7/2018 | Cho et al. | |

FOREIGN PATENT DOCUMENTS

| | | |
|---|---|---|
| KR | 10-2014-0137170 A | 12/2014 |
| KR | 10-2017-0006761 A | 1/2017 |
| WO | 2017/003043 A1 | 1/2017 |

\* cited by examiner

METHOD AND ELECTRONIC APPARATUS FOR DISPLAYING INFORMATION

CROSS-REFERENCE TO RELATED APPLICATION(S)

This application is based on and claims priority under 35 U.S.C. § 119 to Korean Patent Application No. 10-2017-0031353, filed on Mar. 13, 2017, in the Korean Intellectual Property Office, the disclosure of which is incorporated by reference herein in its entirety.

TECHNICAL FIELD

The disclosure relates to a method and electronic apparatus for displaying information. More particularly, the disclosure relates to a method and electronic apparatus for displaying various types of information on a clock graphical user interface (GUI).

BACKGROUND

A user who uses a general electronic apparatus may use a calendar application, installed in the electronic apparatus, to check a schedule. A general calendar application in which a manner of providing information has been changed from paper to an electronic apparatus still employs an existing calendar's configuration with respect to providing information to a user or an existing calendar's screen layout, such that the general calendar application is not intuitive.

In addition, when a user who uses a general electronic apparatus waits for another person in an appointed place, the user may use a text or phone function to obtain information of the other person or to contact the other person. However, a manner in which the user, who uses the general electronic apparatus, directly requests the other person for information, searches for a contact address of the other person, or contacts the other person is inconvenient and not intuitive.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of conveniently, simply, and intuitively providing information, and an electronic apparatus for implementing the method.

In accordance with an aspect of the disclosure, an electronic apparatus is provided. The electronic apparatus includes a transceiver configured to obtain time information related to an operation of an external device, at least one processor configured to generate a clock graphical user interface (GUI) displaying the time information, and a display for displaying the clock GUI, wherein the clock GUI includes an indication area and an indication object moving on the indication area, and wherein the indication object rotates with respect to a center point included in the indication area, and indicates the time information by indicating an area from among a plurality of partial areas included in the indication area.

In accordance with another aspect of the disclosure, a method, performed by an electronic apparatus, of displaying time information related to an operation of an external device is provided. The method includes obtaining time information related to an operation of the external device, and displaying the time information on a clock GUI, wherein the clock GUI includes an indication area and an indication object moving on the indication area, and wherein the indication object rotates with respect to a center point included in the indication area, and indicates the time information by indicating an area from among a plurality of partial areas included in the indication area.

In accordance with another aspect of the disclosure, an electronic apparatus is provided. The electronic apparatus includes a transceiver configured to obtain position information of at least one external device, at least one processor configured to generate a clock GUI displaying the position information, and a display for displaying the clock GUI, wherein the clock GUI includes an indication area and at least one indication object moving on the indication area, and wherein the at least one indication object indicates the at least one external device, rotates with respect to a center point included in the indication area, and indicates the position information by indicating an area from among a plurality of partial areas included in the indication area.

In accordance with another aspect of the disclosure, the at least one processor is further configured to request the at least one external device for transmission of the position information before obtaining the position information, and receive a response permitting the transmission of the position information from the at least one external device.

In accordance with another aspect of the disclosure, the clock GUI comprises a plurality of indication objects that respectively indicate a plurality of external devices, and the display differently displays the plurality of indication objects, based on at least one of a color, brightness, a pattern, a symbol, a letter, a size, and a form.

In accordance with another aspect of the disclosure, the plurality of partial areas respectively corresponds to a plurality of preset positions of interest, and the at least one indication object indicates that the at least one external device is positioned at a position of interest corresponding to an area from among the plurality of partial areas, by indicating the area.

In accordance with another aspect of the disclosure, the plurality of partial areas indicates directions relative to the electronic apparatus, and the at least one indication object indicates that the at least one external device is positioned with respect to the electronic apparatus in a direction corresponding to an area from among the plurality of partial areas, by indicating the area.

In accordance with another aspect of the disclosure, the at least one indication object further indicates a distance from the electronic apparatus to the at least one external device.

In accordance with another aspect of the disclosure, a method, performed by an electronic apparatus, of displaying information is provided. The method includes obtaining position information of at least one external device, and displaying the position information on a clock GUI, wherein the clock GUI includes an indication area and at least one indication object moving on the indication area, and wherein the at least one indication object indicates the at least one external device, rotates with respect to a center point included in the indication area, and indicates the position information by indicating an area from among a plurality of partial areas included in the indication area.

In accordance with another aspect of the disclosure, an electronic apparatus is provided. The electronic apparatus includes a transceiver configured to obtain information related to an estimated arrival time of at least one external device, at least one processor configured to generate a clock GUI displaying the estimated arrival time of the at least one external device, based on the information, and a display for displaying the clock GUI, wherein the clock GUI includes an indication area and at least one indication object moving on the indication area, and wherein the at least one indication object indicates the at least one external device, rotates with respect to a center point included in the indication area, and indicates the estimated arrival time of the at least one external device by indicating an area from among a plurality of partial areas included in the indication area.

In accordance with another aspect of the disclosure, the information related to the estimated arrival time comprises information about at least one of a position of the at least one external device, a moving speed of the at least one external device, and a type of transportation that a user of the at least one external device uses to move to another place, and the at least one processor is further configured to calculate the estimated arrival time of the at least one external device, based on the information.

In accordance with another aspect of the disclosure, the transceiver is further configured to obtain new information related to the estimated arrival time of the at least one external device, and the at least one processor is further configured to control the display to display the clock GUI that is updated based on the new information.

In accordance with another aspect of the disclosure, a method, performed by an electronic apparatus, of displaying information is provided. The method includes obtaining information related to an estimated arrival time of at least one external device, and displaying the estimated arrival time of the at least one external device on a clock GUI, based on the information, wherein the clock GUI includes an indication area and at least one indication object moving on the indication area, and wherein the at least one indication object indicates the at least one external device, rotates with respect to a center point included in the indication area, and indicates the estimated arrival time of the at least one external device by indicating an area from among a plurality of partial areas included in the indication area.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
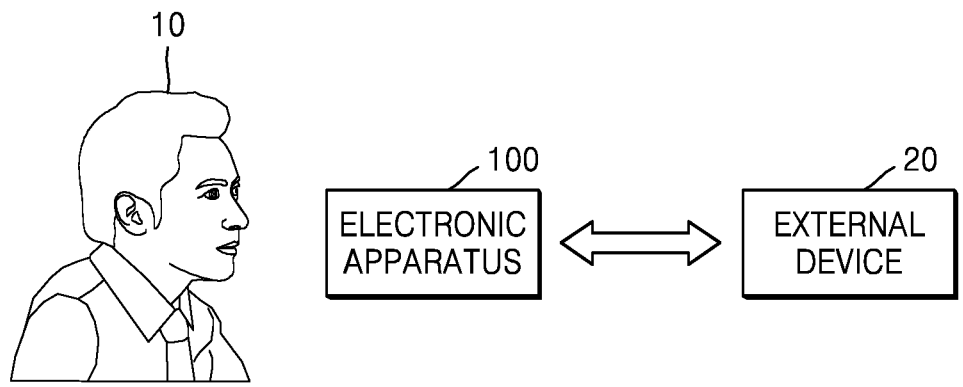
FIGS. 1A, 1B, and 1C illustrate examples of an information providing system including an electronic apparatus according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Some embodiments of the disclosure may be described in terms of functional block components and various processing operations. Some or all of functional blocks may be realized by any number of hardware and/or software components configured to perform the specified functions. For example, the functional blocks of the disclosure may be implemented by one or more microprocessors or may be implemented by circuit components for predetermined functions. In addition, for example, the functional blocks of the disclosure may be implemented with any programming or various scripting languages. The functional blocks may be implemented in algorithms that are executed on one or more processors. Furthermore, the disclosure could employ any number of conventional techniques for electronics configuration, signal processing and/or data processing, and the like.

Furthermore, the connecting lines or connectors shown in the various drawings are intended to represent functional relations and/or physical or logical couplings between the various elements. It should be noted that many alternative or additional functional relations, physical connections or logical connections may be present in a practical device.

Reference will now be made in detail to various embodiments, examples of which are illustrated in the accompanying drawings. As used herein, the term "and/or" includes any and all combinations of one or more of the associated listed items. Expressions such as "at least one of," when preceding a list of elements, modify the entire list of elements and do not modify the individual elements of the list.

Figure 1B:
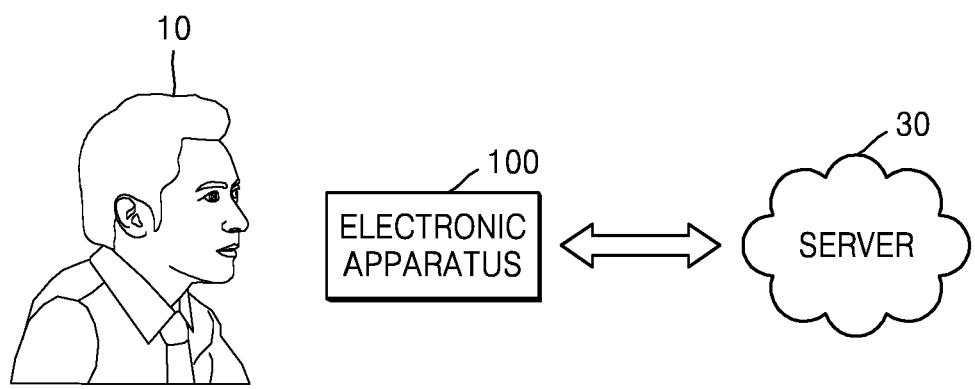
Figure 1C:
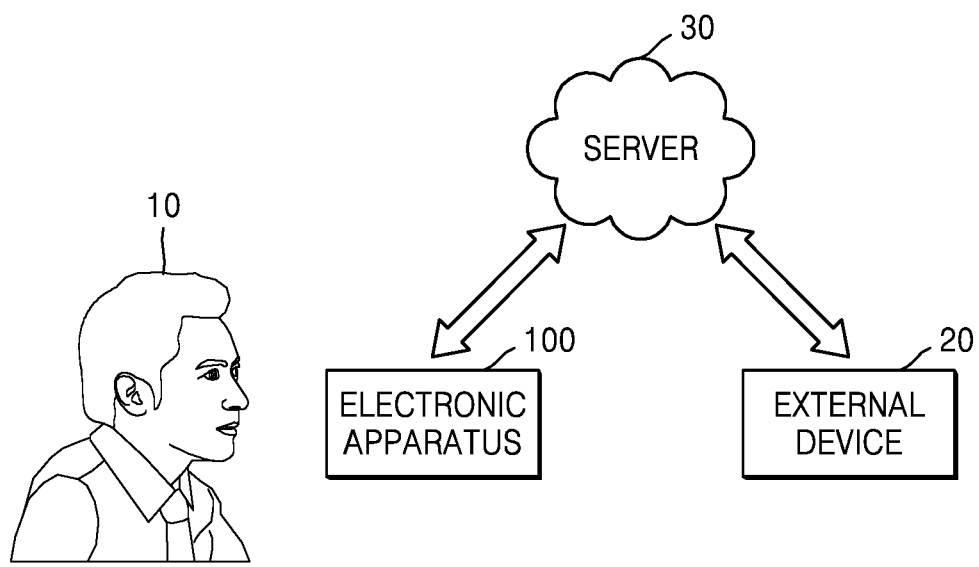

FIGS. 1A, 1B, and 1C illustrate examples of an information providing system including an electronic apparatus 100 according to various embodiment of the disclosure.

As illustrated in FIG. 1A, the electronic apparatus 100 according to the embodiment may be connected to an external device 20 in a wired or wireless manner. For example, the electronic apparatus 100 may include, but is not limited to, a wearable device such as a smart watch, a mobile computing device or a non-mobile computing device which includes a smartphone, a tablet personal computer (PC), a PC, a smart television (TV), a personal digital assistant (PDA), home appliances, a laptop, a media player, a microserver, a global positioning system (GPS) device, an electronic book (e-book) terminal, a terminal for digital broadcasting, navigation, a kiosk, electronic control devices of a digital camera and a vehicle, central information display (CID), or the like.

The electronic apparatus 100 may receive information from the external device 20, and may display the received information to a user 10. For example, the external device 20 connected to the electronic apparatus 100 may include a wearable device such as a smart watch, a mobile computing device or a non-mobile computing device which includes a smartphone, a tablet PC, a PC, a smart TV, a PDA, home appliances, a laptop, a media player, a microserver, a GPS device, an e-book terminal, a terminal for digital broadcasting, navigation, a kiosk, electronic control devices of a digital camera and a vehicle, a CID, or the like.

The electronic apparatus 100 may receive at least one of information related to an operation of the external device 20, information related to a position of the external device 20, and information related to estimated arrival time of the external device 20, and may display the received information to the user 10. For example, the electronic apparatus 100 may receive, from the external device 20, and display the information related to an operation of the external device 20. As another example, the electronic apparatus 100 may receive information about an execution screen on which an application is being executed or content is being reproduced by the external device 20, and may changelessly display the execution screen displayed by the external device 20 or may display a processed execution screen.

The electronic apparatus 100 according to the embodiment may receive a user input from the user 10, and may transmit the received user input to the external device 20. Alternatively, the electronic apparatus 100 may transmit information related to the user 10 to the external device 20. The external device 20 may operate based on the user input or the information related to the user 10 which is received from the electronic apparatus 100. Conversely, the external device 20 may receive a user input or information related to the user 10. The electronic apparatus 100 may operate based on the user input or the information related to the user 10 which is received from the external device 20.

As illustrated in FIG. 1B, the electronic apparatus 100 may be connected to a server 30 in a wired or wireless manner.

The electronic apparatus 100 may receive information from the server 30, and may display the received information to the user 10.

For example, the electronic apparatus 100 may download an application from the server 30, and may display an execution screen on which the downloaded application is being executed. Alternatively, for example, the electronic apparatus 100 may download content from the server 30 or may stream the content, and may display a screen on which the content is being reproduced.

The electronic apparatus 100 may receive a user input from the user 10, and may transmit the received user input to the server 30. Alternatively, the electronic apparatus 100 may transmit information related to the user 10 to the server 30. For example, in order to search for predetermined content or information, the electronic apparatus 100 may transmit a keyword input from the user 10 to the server 30. The electronic apparatus 100 may display a search result to the user 10. The electronic apparatus 100 may display a screen on which found content is reproduced.

As illustrated in FIG. 1C, the information providing system according to the embodiment may include the electronic apparatus 100, the external device 20, and the server 30. The electronic apparatus 100 and the server 30 may be connected to each other in a wired or wireless manner, and the server 30 and the external device 20 may be connected to each other in a wired or wireless manner.

The electronic apparatus 100 may receive information about the external device 20 from the server 30, and may display the received information to the user 10. The electronic apparatus 100 may receive, from the server 30, at least one of the information related to an operation of the external device 20, the information related to a position of the external device 20, and the information related to estimated arrival time of the external device 20, and may display the received information to the user 10.

The electronic apparatus 100 may receive a user input from the user 10, and may transmit the received user input to the external device 20 via the server 30. Alternatively, the electronic apparatus 100 may transmit information related to the user 10 to the external device 20 via the server 30. The external device 20 may operate based on the received user input or the information related to the user 10. Conversely, the external device 20 may receive a user input or information related to the user 10, and may transmit the user input or the information related to the user 10 to the electronic apparatus 100 via the server 30. The electronic apparatus 100 may operate based on the received user input or the information related to the user 10.

As illustrated in FIGS. 1A, 1B, and 1C, the electronic apparatus 100 has been developed to operate in various forms and manners, such that the electronic apparatus 100 is requested to efficiently provide various types of information to the user 10. Thus, the electronic apparatus 100 according to the embodiment may use a clock graphical user interface (GUI) so as to conveniently, simply, and intuitively provide information. The clock GUI having a form of an analog clock indicating time by using hour and minute hands provides information in a manner familiar to a user, such that the user may intuitively recognize the information.

Figure 2:
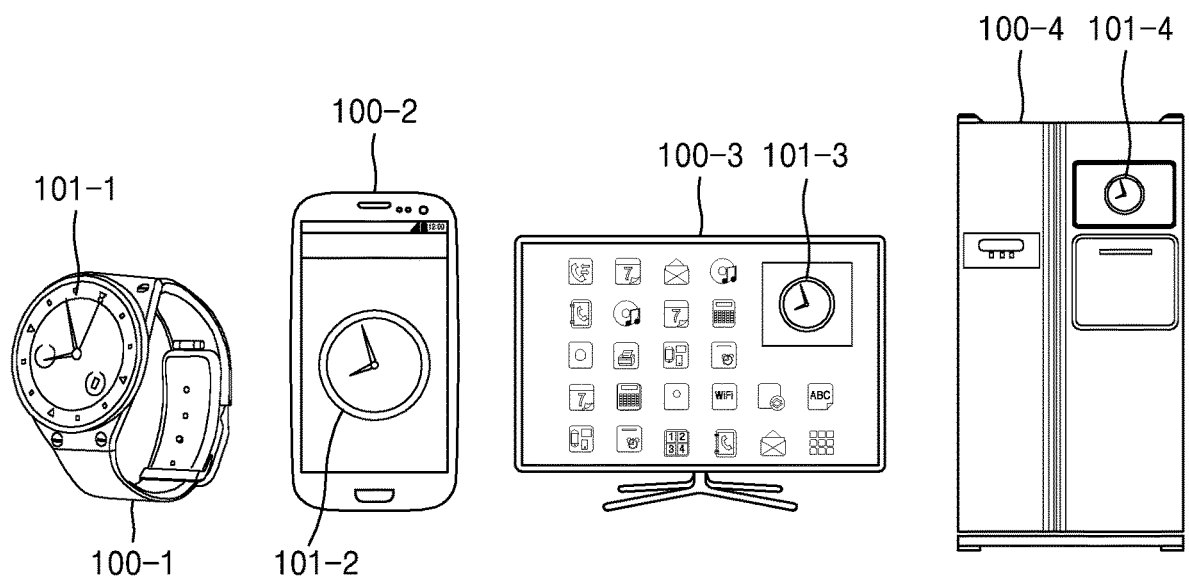
FIG. 2 illustrates examples of the electronic apparatus according to an embodiment of the disclosure.

FIG. 2 illustrates examples of the electronic apparatus 100 according to an embodiment of the disclosure.

For example, the electronic apparatus 100 may be embodied as a wearable device 100-1 in the form of a wristwatch. The wearable device 100-1 may display various types of information on a clock GUI 101-1.

As another example, the electronic apparatus 100 may be embodied as a mobile terminal such as a smartphone 100-2. The smartphone 100-2 may display various types of information on a clock GUI 101-2.

As another example, the electronic apparatus 100 may be embodied as home appliances such as a television (TV) 100-3, a refrigerator 100-4, or the like. The TV 100-3 and the refrigerator 100-4 may display various types of information on respective clock GUIs 101-3 and 101-4.

As illustrated in FIG. 2, the electronic apparatus 100 according to the embodiment may provide information by efficiently using a limit-size display area by using a clock GUI.

Figure 3:
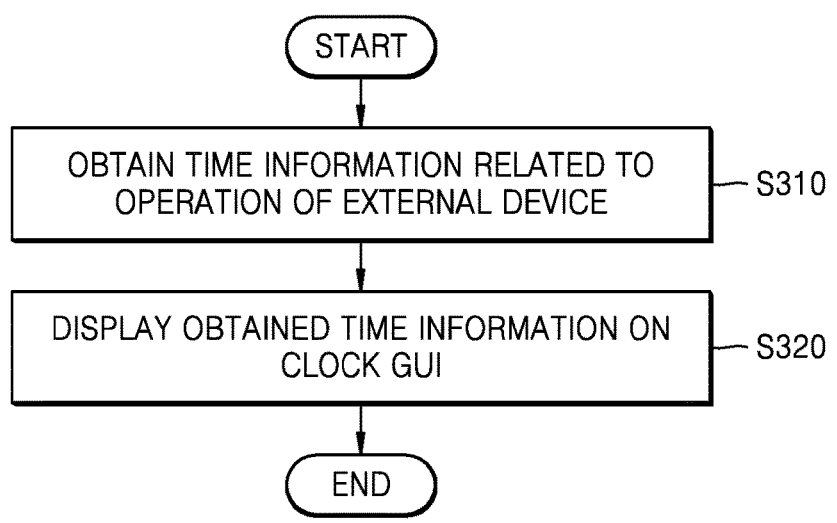
FIG. 3 is a flowchart of a method of displaying time information related to an operation of an external device, the method being performed by the electronic apparatus according to an embodiment of the disclosure.

FIG. 3 is a flowchart of a method of displaying time information related to an operation of an external device, the method being performed by the electronic apparatus 100 according to an embodiment of the disclosure.

In operation S310, the electronic apparatus 100 may obtain time information related to an operation of the external device.

The electronic apparatus 100 may receive the time information related to the operation of the external device from the external device that is connected to the electronic apparatus 100 in a wired or wireless manner.

The time information related to the operation of the external device, which is obtained by the electronic apparatus 100, may include information about at least one of an estimated time period for performing the operation by the external device, a time period taken to perform the operation, a time scheduled to start the operation, a time the operation starts, and a time the operation ends. For example, the time information related to the operation of the external device may include at least one of information related to a time period taken for the external device to download an application or content, information related to a time period taken for the external device to install the application, information related to a time period taken for the external device to reproduce the content, information related to a time scheduled to turn on or off power of the external device, and information related to a time at which the external device performed a call function.

The electronic apparatus 100 may further obtain, in addition to the time information, information related to an operation of executing an application or information related to an operation of executing a particular function, the operation being performed by the external device. The electronic apparatus 100 may receive at least one of a name of the application executed by the external device, a function performed by the application and time information related to execution of the application. The electronic apparatus 100 may receive at least one of a name of a function performed by the external device and time information related to the performing of the function.

In operation S320, the electronic apparatus 100 may display the time information obtained in operation S310 on a clock GUI.

The clock GUI may include an indication area and an indication object. The indication object may include an indication object moving on the indication area. The indication area may correspond to a dial of an analog clock, and the indication object may correspond to hour and minute hands of the analog clock. The indication area may have a form of the dial of the analog clock, and the indication object may have a form of the hour and minute hands of the analog clock. The indication object may rotate with respect to a center point included in the indication area. The indication object may indicate time information by indicating a predetermined point or an area from among a plurality of partial areas included in the indication area. Each of the plurality of partial areas included in the indication area may represent a predetermined time unit.

For example, the indication area may include 12 or 24 markings, and a partial area between two adjacent markings may represent 1 hour. However, a time unit indicated by each of the plurality of partial areas is not limited thereto, and thus may be variously set as 1 second, several seconds, 1 minute, several minutes, 10 minutes, several tens of minutes, 1 hour, several hours, 1 day, several days, etc.

Before the electronic apparatus 100 displays the clock GUI, the electronic apparatus 100 may further display a list of a plurality of external devices connected or connectable to the electronic apparatus 100. The electronic apparatus 100 may receive, from a user, an input of selecting an external device from the list of a plurality of external devices. In response to the input of selecting the external device, the electronic apparatus 100 may display a clock GUI indicating information related to an operation of the selected external device.

The electronic apparatus 100 may display time information on the clock GUI, the time information obtained at a current time. The electronic apparatus 100 may generate a clock CUI including an indication object indicating a partial area corresponding to the obtained time information.

For example, the clock GUI generated by the electronic apparatus 100 may include an indication object indicating a partial area distant from a reference line by a distance or a degree corresponding to the time information. The reference line may correspond to a boundary line between two partial areas included in the plurality of partial areas. For example, the boundary line may be a line connecting a zero point with the center point on the indication area. The zero point on the indication area may correspond to a point indicating 12 o'clock in the analog clock.

As another example, the clock GUI generated by the electronic apparatus 100 may include an indication object indicating a partial area distant from a partial area corresponding to the current time by a distance corresponding to the time information. The electronic apparatus 100 may determine the partial area corresponding to the current time from among the plurality of partial areas. For example, the partial area corresponding to the current time may correspond to an area indicated by an hour hand of the analog clock to show the current time.

The electronic apparatus 100 may display a clock GUI including a plurality of indication objects respectively indicating the plurality of external devices. Each of the indication objects may indicate time information of an external device corresponding to an indication object, by indicating a predetermined point or a partial area from among the plurality of partial areas included in the indication area.

The electronic apparatus 100 may differently display the indication objects included in the clock GUI, based on at least one of a color, brightness, a pattern, a symbol, a letter, a size, and a form. The electronic apparatus 100 may apply at least one of a color, brightness, a pattern, a symbol, a letter, a size, and a form, which indicates the external device, to each of the indication objects, and then the user may identify which indication object indicates which external device.

The electronic apparatus 100 may generate a clock GUI, based on the information related to an operation of executing an application or the information related to an operation of executing a particular function, the operation being performed by the external device. The electronic apparatus 100 may generate and display a clock GUI, based on at least one of the name of the application executed by the external device, the function performed by the application and the time information related to execution of the application. The electronic apparatus 100 may generate and display a clock GUI, based on at least one of the name of a function performed by the external device and the time information related to performance of the function. The electronic apparatus 100 may display the clock GUI and may further display the information related to an operation of executing an application or the information related to an operation of executing a particular function, the operation being performed by the external device.

The electronic apparatus 100 may display the clock GUI and may further display a control GUI for controlling the external device. The control GUI may include at least one of a GUI for controlling the external device to start performing a predetermined function, a GUI for controlling the external device to pause the performing of the predetermined function, and a GUI for controlling the external device to end the performing of the predetermined function.

The user of the electronic apparatus 100 may control the operation of the external device by inputting a user input with respect to the control GUI or by moving the indication object.

The electronic apparatus 100 may adjust a time period related to the operation of the external device, based on a distance or a degree by which the user moves the indication object. The electronic apparatus 100 may change the time information related to the operation of the external device, based on a user input of moving the indication object by a predetermined distance or a predetermined degree, and may transmit the changed time information to the external device. The electronic apparatus 100 may display the indication object at a position moved by the predetermined distance or the predetermined degree based on the user input. For example, the electronic apparatus 100 may increase or decrease an operation time period of the external device or may adjust a time scheduled for the external device to perform a predetermined operation, based on the user input of moving the indication object.

Thus, the electronic apparatus 100 may allow the user to intuitively check information, by displaying time information on a clock GUI, the time information being related to an operation of the external device interoperating with the electronic apparatus 100. In addition, the electronic apparatus 100 may allow the user to conveniently manage the external device, by controlling a time period based on a user input received via the clock GUI, the time being related to the operation of the external device.

FIGS. 4, 5, 6, 7, 8, and 9 illustrate examples of a clock GUI of the electronic apparatus 100 which displays time information related to an operation of an external device according to various embodiments of the disclosure.

Figure 4:
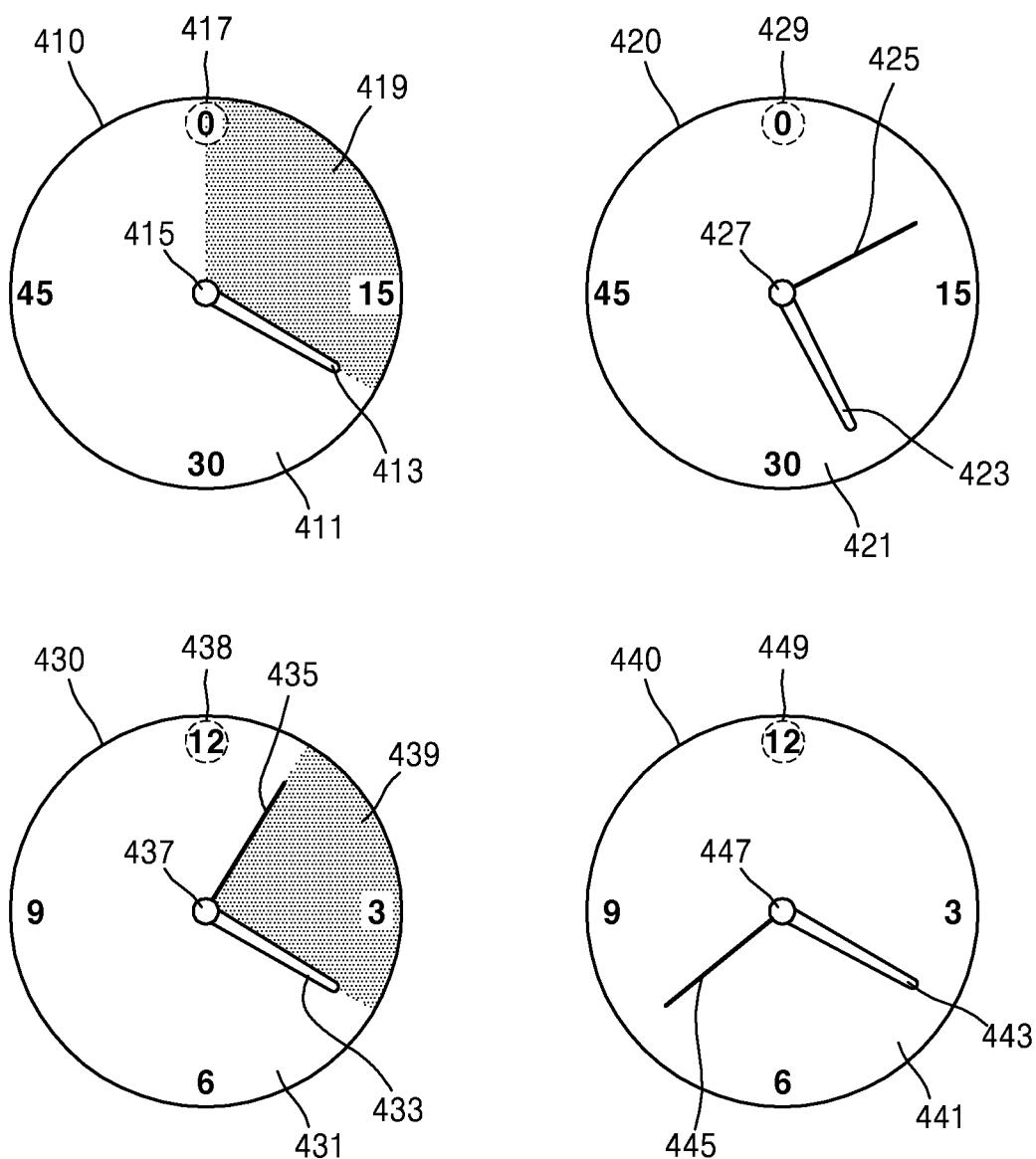
FIGS. 4, 5, 6, 7, 8, and 9 illustrate examples of a clock graphical user interface (GUI) of the electronic apparatus which displays time information related to an operation of an external device according to various embodiments of the disclosure.

As illustrated in FIG. 4, the electronic apparatus 100 may display time information related to an operation of the external device on a clock GUI, in various manners.

A clock GUI 410 generated by the electronic apparatus 100 may include an indication object 413 moving on an indication area 411 with respect to a center point 415. The indication object 413 may indicate a partial area distant from a reference line by a distance or a degree corresponding to the time information. The reference line may correspond to a line connecting a zero point 417 with the center point 415 on the indication area 411.

The clock GUI 410 may indicate an estimated time period for performing a predetermined operation by the external device, or an estimated time period for ending the performing of the predetermined operation by the external device. For example, the clock GUI 410 may indicate an estimated time period taken for the external device to download an application or content.

The indication area 411 of the clock GUI 410 may indicate 60 minutes, and 60 partial areas composing the indication area 411 may each indicate 1 minute. The indication area 411 may include a marking or a number indicating a time corresponding to a point or at least one area from among a plurality of partial areas. The indication area 411 may include numbers respectively indicating 0 minute, 15 minutes, 30 minutes, and 45 minutes. Because the indication object 413 of the clock GUI 410 indicates a partial area distant from the reference line by 120 degrees, the clock GUI 410 indicates that a time period related to the operation of the external device is 20 minutes. The reference line may indicate a time at which the external device is estimated to complete the operation.

The electronic apparatus 100 may display an area 419 to be different from other areas in order to indicate a time period (e.g., 20 minutes) associated with an operation of the external device with respect to a time period (e.g., 60 minutes) indicated by the indication area 411. The indication object 413 may indicate a decrease in a time period left for the external device to complete a predetermined operation, by moving in a counterclockwise direction according to flow of time. The area 419 may indicate partial areas to be indicated based on movement of the indication object 413 according to flow of time.

As another example, a clock GUI 420 generated by the electronic apparatus 100 may include first and second indication objects 423 and 425 moving on an indication area 421 with respect to a center point 427. The first and second indication objects 423 and 425 may indicate partial areas distant from a reference line by a distance or a degree corresponding to time information. The reference line may be a line connecting a zero point 429 with the center point 427 on the indication area 421. The first and second indication objects 423 and 425 may respectively indicate information related to different external devices.

The clock GUI 420 according to the embodiment may indicate a time scheduled for the external device to perform a predetermined operation. For example, the clock GUI 420 may indicate a time scheduled for the external device to turn on or off power of the external device.

A whole indication area 421 of the clock GUI 420 may indicate 60 minutes, and 60 partial areas composing the indication area 421 may each indicate 1 minute. The indication area 421 may include a marking or a number indicating a time corresponding to a point or at least one area from among a plurality of partial areas. The indication area 421 may include numbers respectively indicating 0 minute, 15 minutes, 30 minutes, and 45 minutes.

For example, when the first indication object 423 of the clock GUI 420 indicates a partial area distant from the reference line by 150 degrees, the clock GUI 420 may indicate that a scheduled time associated with an operation of a first external device corresponding to the first indication object 423 will be in 25 minutes. When the second indication object 425 of the clock GUI 420 indicates a partial area distant from the reference line by 60 degrees, the clock GUI 420 may indicate that a scheduled time associated with an operation of a second external device corresponding to the second indication object 425 will be in 10 minutes. The first and second indication objects 423 and 425 may each indicate a time scheduled for the external device to perform a predetermined operation, by moving in a counterclockwise direction according to flow of time.

Alternatively, for example, when a current time is 1 p.m., the first indication object 423 may indicate that the first external device is scheduled to turn on at 1:25 p.m., and the second indication object 425 may indicate that the second external device is scheduled to turn on at 1:10 p.m. When the first and second indication objects 423 and 425 each indicate a scheduled time, the first and second indication objects 423 and 425 may not move according to flow of time and may indicate the scheduled time at fixed positions. However, when the scheduled time is changed, the first and second indication objects 423 and 425 may move to each indicate a partial area corresponding to a changed scheduled time.

As another example, a clock GUI 430 may indicate a time period taken for the external device to perform a predetermined operation. The electronic device 100 may display an area 439 to be different from other areas to indicated the time period for performing the predetermined operation. The clock GUI 430 generated by the electronic apparatus 100 may include first and second indication objects 433 and 435 moving on an indication area 431 with respect to a center point 437.

The indication area 431 of the clock GUI 430 may indicate 12 hours, and 12 partial areas composing the indication area 431 may each indicate 1 hour. However, the embodiment is not limited thereto, and the indication area 431 may include more partial areas, and each of the plurality of partial areas may indicate 1 minute, several minutes, or 10 minutes. The indication area 431 may include a marking or a number indicating a time corresponding to at least one area from among the plurality of partial areas. The indication area 431 may include numbers respectively indicating 12 o'clock, 3 o'clock, 6 o'clock, and 9 o'clock.

The first indication object 433 of the clock GUI 430 may indicate a partial area corresponding to a current time. The first indication object 433 of the clock GUI 430 indicates a partial area distant from a line by 120 degrees, wherein the line connects the center point 437 with a point 438 indicating 12 o'clock on the indication area 431. The first indication object 433 of the clock GUI 430 indicates that the current time is 4 o'clock.

The second indication object 435 of the clock GUI 430 may indicate a partial area distant from a reference line by a degree or a distance corresponding to time information of the external device. For example, the second indication object 435 of the clock GUI 430 may indicate a time at which the external device starts to perform a predetermined operation. The second indication object 435 of the clock GUI 430 indicates a partial area distant from the line by 30 degrees, wherein the line connects the center point 437 with the point 438 indicating 12 o'clock on the indication area 431. The second indication object 435 of the clock GUI 430 indicates that a time at which the external device starts to perform the predetermined operation is 1 o'clock. Because the second indication object 435 that is supposed to indicate a time at which the performing of an operation is started indicates a partial area distant from the first indication object 433 indicating a current time by 90 degrees in a clockwise direction, the clock GUI 430 indicates the time period taken for the external device to perform the predetermined operation is 3 hours.

The first indication object 433 may indicate an increase in a time period taken for the external device to perform the predetermined operation, by moving in the clockwise direction according to flow of time.

As another example, a clock GUI 440 generated by the electronic apparatus 100 may include first and second indication objects 443 and 445 moving on an indication area 441 with respect to a center point 447. The clock GUI 440 may indicate a time at which the external device starts to perform a predetermined operation and/or a time at which the external device ends the performing of the predetermined operation. For example, the clock GUI 440 may indicate a time at which the external device starts to download content, and a time at which the external device ends the downloading of the content.

The indication area 441 of the clock GUI 440 may indicate 12 hours, and 12 partial areas composing the indication area 441 may each indicate 1 hour. However, the embodiment is not limited thereto, and the indication area 441 may include more partial areas, and each of the plurality of partial areas may indicate 1 minute, several minutes, or 10 minutes. The indication area 441 may include a marking or a number indicating a time corresponding to at least one area from among the plurality of partial areas. The indication area 441 may include numbers respectively indicating 12 o'clock, 3 o'clock, 6 o'clock, and 9 o'clock.

For example, the first indication object 443 of the clock GUI 440 may indicate a time at which the external device starts to perform a predetermined operation. The first indication object 443 indicates a partial area distant from a line by 120 degrees, wherein the line connects the center point 447 with a point 449 indicating 12 o'clock on the indication area 441. The first indication object 443 of the clock GUI 440 indicates that the external device starts to perform the predetermined operation at 4 o'clock.

The second indication object 445 of the clock GUI 440 indicates that a time at which the external device ends the performing of the predetermined operation. The second indication object 445 indicates a partial area distant from the line by 240 degrees, wherein the line connects the center point 447 with the point 449 indicating 12 o'clock on the indication area 441. The second indication object 445 of the clock GUI 440 may indicate that the external device ends the performing of the predetermined operation at 8 o'clock.

Alternatively, for example, the first indication object 443 of the clock GUI 440 may indicate a current time. The first indication object 443 indicates a partial area distant from the line by 120 degrees, wherein the line connects the center point 447 with the point 449 indicating 12 o'clock on the indication area 441. The first indication object 443 of the clock GUI 440 may indicate that a current time is 4 o'clock.

The second indication object 445 of the clock GUI 440 may indicate a time at which the external device is estimated to end the performing of the predetermined operation. The second indication object 445 indicates a partial area distant from the line by 240 degrees, wherein the line connects the center point 447 with the point 449 indicating 12 o'clock on the indication area 441. The second indication object 445 of the clock GUI 440 may indicate that the external device is estimated to end the performing of the predetermined operation at 8 o'clock. The clock GUI 440 may indicate that the performing of the predetermined operation will end in 4 hours from the current time.

The first indication object 443 may indicate that a time at which the external device ends the performing of the predetermined operation is coming, by moving in a clockwise direction according to flow of time.

Figure 5:
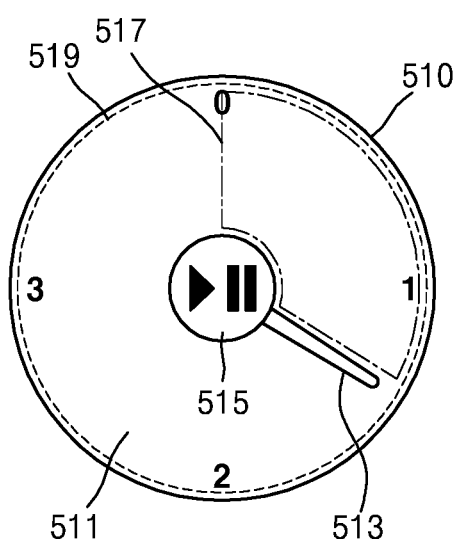

In addition, as illustrated in FIG. 5, the electronic apparatus 100 may display, on a clock GUI, time information related to content reproduced by the external device.

The electronic apparatus 100 may obtain the time information related to content reproduced by the external device, and may generate a clock GUI 510 displaying the obtained time information.

The clock GUI 510 includes an indication area 511 and an indication object 513 moving on the indication area 511. The indication object 513 rotates with respect to a center point included in the indication area 511. The indication object 513 may indicate the time information related to content reproduced by the external device, by indicating an area from among a plurality of partial areas included in the indication area 511. For example, the indication object 513 may indicate a section that is being reproduced by the external device.

A whole indication area 519 of the clock GUI 510 may indicate a time taken to reproduce all parts of content, and an area 513 between a reference line and a point indicated by the indication object 513 may indicate a time period in which the external device reproduces the content until now from a start of the reproduction. With reference to FIG. 5, an example is described in which numbers 1, 2, 3, and 4 are displayed to indicate a time corresponding to four areas from among the plurality of partial areas, but the embodiment is not limited thereto. An indication area may display a content reproduction time, or may display a ratio of a current reproduction time to a whole reproduction time by using a symbol %.

The electronic apparatus 100 may display content information along with a clock GUI displaying time information related to content reproduced by the external device.

The electronic apparatus 100 may further display a control GUI for controlling the external device. The clock GUI 510 illustrated in FIG. 5 may include a control GUI 515 to control a content reproducing operation by the external device. The electronic apparatus 100 may control the external device to stop or resume reproduction of content, based in a user input received via the control GUI 515. For example, the electronic apparatus 100 may control the external device to stop the reproduction of content, in response to a user input of touching the control GUI 515 during the reproduction of content. Alternatively, for example, the electronic apparatus 100 may control the external device to resume the reproduction of content, in response to a user input of touching the control GUI 515 while the reproduction of content is stopped.

The electronic apparatus 100 may control the external device to repeatedly reproduce a certain section of content, based on a user input of moving the indication object 513. For example, the electronic apparatus 100 may control the external device to repeatedly reproduce the certain section of the content, in response to a user input of dragging and dropping the indication object 513 from a first position to a second position, wherein the certain section corresponds to a section from the first position to the second position.

Figure 6:
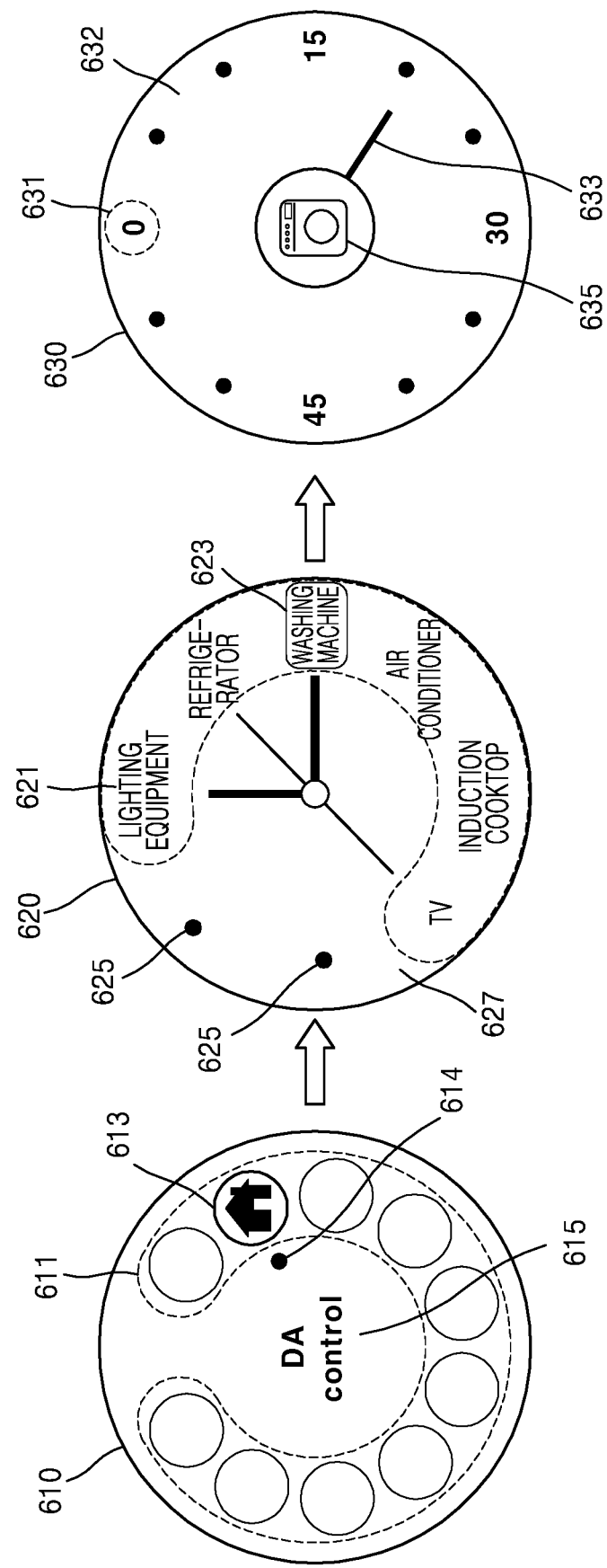

FIG. 6 illustrates a user interface (UI) of the electronic apparatus 100 which are displayed to indicate time information related to an operation of the external device according to an embodiment of the disclosure.

The electronic apparatus 100 may display a screen 610 including a list 611 from which one is selected from among applications to be executed by the electronic apparatus 100 or functions to be provided by the electronic apparatus 100. The list 611 may include a plurality of icons respectively corresponding to the applications to be executed by the electronic apparatus 100 or the functions to be provided by the electronic apparatus 100.

The electronic apparatus 100 may receive a user input of selecting an icon 613 from among the plurality of icons included in the list 611. The electronic apparatus 100 may display, on the screen 610, a pointer 614 indicating the user-selected icon 613, based on a user input. The electronic apparatus 100 may display, on the screen 610, a name 615 of the user-selected icon 613, based on a user input.

The electronic apparatus 100 may display a clock GUI 620 including a list 621 of external devices connected or connectable to the electronic apparatus 100, in response to a user input of selecting the icon 613. The electronic apparatus 100 may display the clock GUI 620 including the list 621 of external devices so as to receive an input of selecting one of the external devices. The connection between the electronic apparatus 100 and an external device may mean that the electronic apparatus 100 may exchange information or a signal with the external device in a wired or wireless manner.

The electronic apparatus 100 may display the list 621 including a plurality of icons respectively corresponding to the external devices that are connected or connectable to the electronic apparatus 100. The icons included in the list 621 may each include a letter, a symbol, or an image indicating an external device. Referring to FIG. 6, the clock GUI 620 displays icons including names of the external devices, but the embodiment is not limited thereto. For example, an icon corresponding to an external device may include a particular image indicating the external device.

Referring to the clock GUI 620 of FIG. 6, the electronic apparatus 100 may be connected or connectable to lighting equipment, a refrigerator, a washing machine, an air conditioner, an induction cooktop, and a TV in a wired or wireless manner. The electronic apparatus 100 may add an external device of which time information is provided by the electronic apparatus 100, in response to a user input of selecting an icon 625 included in the clock GUI 620.

A screen provided by the electronic apparatus 100 may include an indication area indicating a plurality of external devices, and at least one indication object indicating at least one external device from among the plurality of external devices while the at least one indication object rotates with respect to a center point included in the indication area. For example, the at least one indication object may indicate the at least one external device that is activated. The activated at least one external device may refer to an external device whose power is turned on, an operating external device, or an external device controllable by the electronic apparatus 100.

For example, the electronic apparatus 100 may display a screen that includes an indication area indicating a plurality of external devices connected to the electronic apparatus 100, and at least one indication object indicating an operating at least one external device. For example, the clock GUI 620 of FIG. 6 may indicate, by using an indication area 627 and indication objects 629, that the electronic apparatus 100 are connected to a plurality of external devices including the lighting equipment, the refrigerator, the washing machine, the air conditioner, the induction cooktop, and the TV, and the lighting equipment, the refrigerator, the washing machine, and the TV from among the plurality of external devices are currently operating.

As another example, the electronic apparatus 100 may display a screen that includes an indication area indicating a plurality of external devices connectable to the electronic apparatus 100, and at least one indication object indicating at least one external device that is already connected to the electronic apparatus 100. For example, the clock GUI 620 of FIG. 6 may indicate, by using the indication area 627 and the indication objects 629, that the electronic apparatus 100 are connectable to the plurality of external devices including the lighting equipment, the refrigerator, the washing machine, the air conditioner, the induction cooktop, and the TV, and the lighting equipment, the refrigerator, the washing machine, and the TV from among the plurality of external devices are currently connected to the electronic apparatus 100.

When particular notification is received from an external device, the electronic apparatus 100 may indicate, by using an indication object, that the particular notification has been received. For example, the electronic apparatus 100 may notify a user of that the particular notification has been received from the external device indicated by the indication object, by changing a color, a thickness, brightness, or flickering of the indication object. Alternatively, for example, the electronic apparatus 100 may notify a user of that the particular notification has been received from the external device indicated by the indication object, by changing a color or brightness of each of icons included in a list of a plurality of external devices included in an indication area.

The electronic apparatus 100 may receive a user input of selecting an icon 623 from among icons indicated by the indication objects 629. The icon 623 may correspond to the washing machine. The electronic apparatus 100 may display detailed information related to a selected external device, in response to a user input of selecting the external device. In response to the user input of selecting the icon 623, the electronic apparatus 100 may display a clock GUI 630 displaying time information related to an operation of the washing machine.

The clock GUI 630 displayed by the electronic apparatus 100 may include an indication object 633 moving on an indication area 632 with respect to a center point. The indication object 633 may indicate a partial area distant from a reference line by a distance or a degree corresponding to time information. The reference line may correspond to a line connecting a zero point 631 with the center point on the indication area 632.

The clock GUI 630 may indicate an estimated time period taken for the washing machine to end the performing of a predetermined operation. For example, the clock GUI 630 may indicate a time period taken for the washing machine to end a spin-drying function.

A whole indication area 632 of the clock GUI 630 may indicate 60 minutes, and 60 partial areas composing the whole indication area 632 may each indicate 1 minute. The indication area 632 may include a marking or a number indicating a time corresponding to at least one area from among a plurality of partial areas. The indication area 632 may include numbers respectively indicating 0 minute, 15 minutes, 30 minutes, and 45 minutes, and markings respectively time values between numbered-time values such as 0 minute, 15 minutes, 30 minutes, and 45 minutes. Because the indication object 633 of the clock GUI 630 indicates a partial area distant from the reference line by 120 degrees, the clock GUI 630 may indicate that 20 minutes are left for the washing machine to complete a predetermined operation. The reference line may indicate a time at which the washing machine is estimated to complete the predetermined operation. The indication object 633 may indicate a decrease in a time period left for the washing machine to complete the predetermined operation, by moving in a counterclockwise direction according to flow of time.

The clock GUI 630 displaying time information related to an operation of the washing machine may include a letter, a symbol, or an image indicating the washing machine. Also, the clock GUI 630 may include detailed information related to the operation of the washing machine. The clock GUI 630 may display information about the operation of the washing machine by using a letter, a symbol, or an image. The clock GUI 630 may further include a control GUI 635 for controlling the washing machine. The electronic apparatus 100 may control the washing machine to stop or resume the performing of the predetermined operation, based on a user input received via the control GUI 635.

Figure 7:
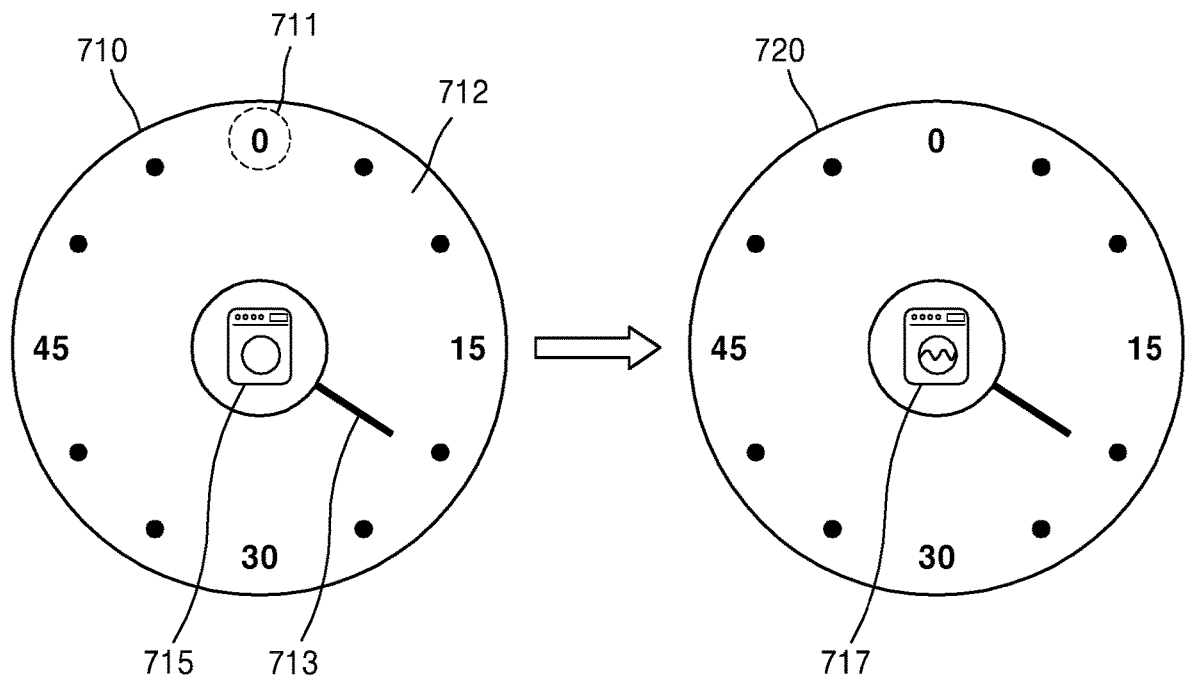

FIG. 7 illustrates clock GUIs of the electronic apparatus 100 which further include control GUIs for controlling an external device according to an embodiment of the disclosure.

A clock GUI 710 displayed by the electronic apparatus 100 may include an indication object 713 moving on an indication area 712 with respect to a center point. The indication object 713 may indicate a partial area distant from a reference line by a distance or a degree corresponding to time information. The reference line may correspond to a line connecting a zero point 711 with the center point on the indication area 712. The clock GUI 710 may indicate an estimated time period taken for a washing machine to end the performing of a predetermined operation. For example, the clock GUI 710 may indicate that 20 minutes are left for the washing machine to end a spin-drying function.

The clock GUI 710 displaying time information related to an operation of the washing machine may include a letter, a symbol, or an image indicating the washing machine. In addition, the clock GUI 710 may include detailed information related to the operation of the washing machine. The clock GUI 710 may display, by using a letter, a symbol, or an image, information about an operation that is being performed by the washing machine. The clock GUI 710 may further include a control GUI 715 for controlling the washing machine.

The electronic apparatus 100 may control the washing machine to stop or resume the performing of the predetermined operation, based on a user input received via the control GUI 715. For example, while the washing machine performs the spin-drying function, the electronic apparatus 100 may control the washing machine to stop the spin-drying function, in response to a user input of touching the control GUI 715.

When an operational state of the washing machine is changed, the electronic apparatus 100 may change the letter, the symbol, or the image included in the control GUI 715. For example, when the spin-drying function of the washing machine is stopped, as illustrated in a clock GUI 720 of FIG. 7, the electronic apparatus 100 may change the image included in the control GUI 715 to an image included in a control GUI 717.

Figure 8:
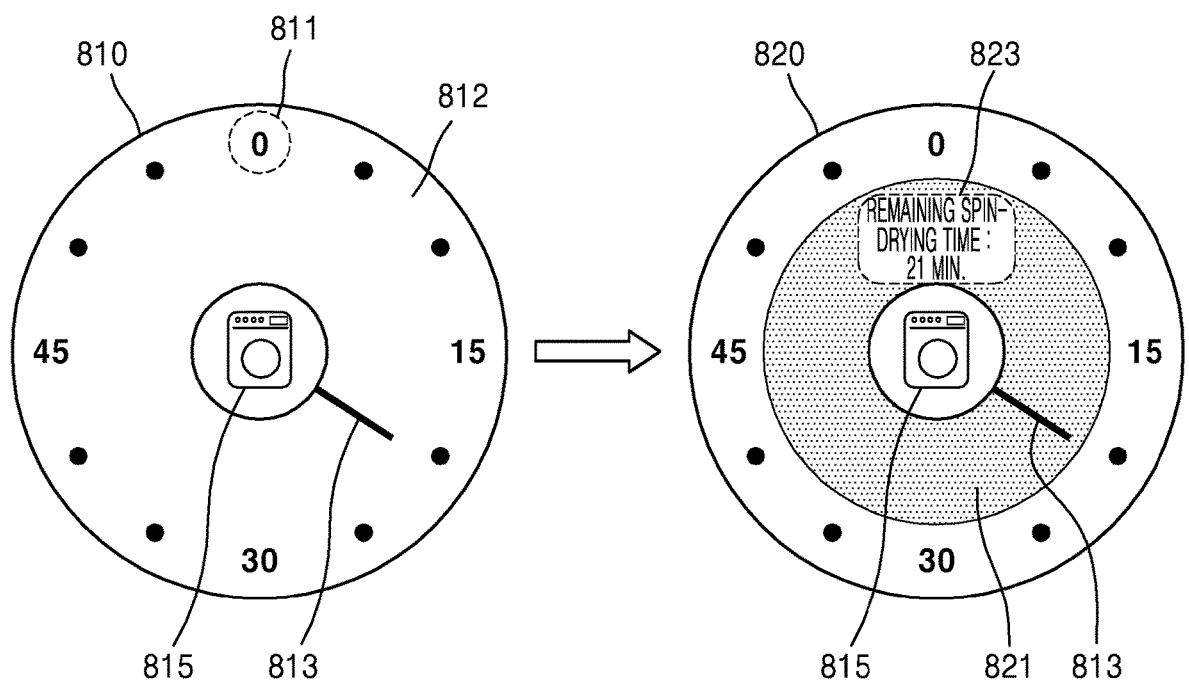

FIG. 8 illustrates a clock GUI 810 of the electronic apparatus 100 which further displays detailed information related to an external device according to an embodiment of the disclosure.

The clock GUI 810 displayed on the electronic apparatus 100 may include an indication object 813 moving on an indication area 812 with respect to a center point. The indication object 813 may indicate a partial area distant from a reference line by a distance or a degree corresponding to time information. The reference line may correspond to a line connecting a zero point 811 with the center point on the indication area 812. The clock GUI 810 may indicate a time period estimated for a washing machine to end a predetermined operation. The clock GUI 810 that displays time information related to an operation of the washing machine may include an icon 815 indicating the washing machine.

The electronic apparatus 100 may further display detailed information related to an operation of the external device, based on a user input. For example, the detailed information related to an operation of the external device may include information about a state of the external device, information about a time period left for the external device to complete a predetermined operation, information about a scheduled time with respect to the external device, or the like.

The electronic apparatus 100 may display detailed information related to an operation of the washing machine, based on a user input of touching the icon 815 or the indication object 813. For example, in the case that a user input of touching the indication object 813 of the clock GUI 810 is received, the electronic apparatus 100 may display a clock GUI 820 including an animation effect by which a pop-up window 821 is displayed to display detailed information 823 while the indication object 813 rotates.

The electronic apparatus 100 may remove displayed detailed information from a screen, based on a user input. The electronic apparatus 100 may display again the clock GUI 810 by removing the pop-up window 821 from the screen, based on a user input of touching the pop-up window 821, the icon 815, or the indication object 813 of the clock GUI 820.

Figure 9:
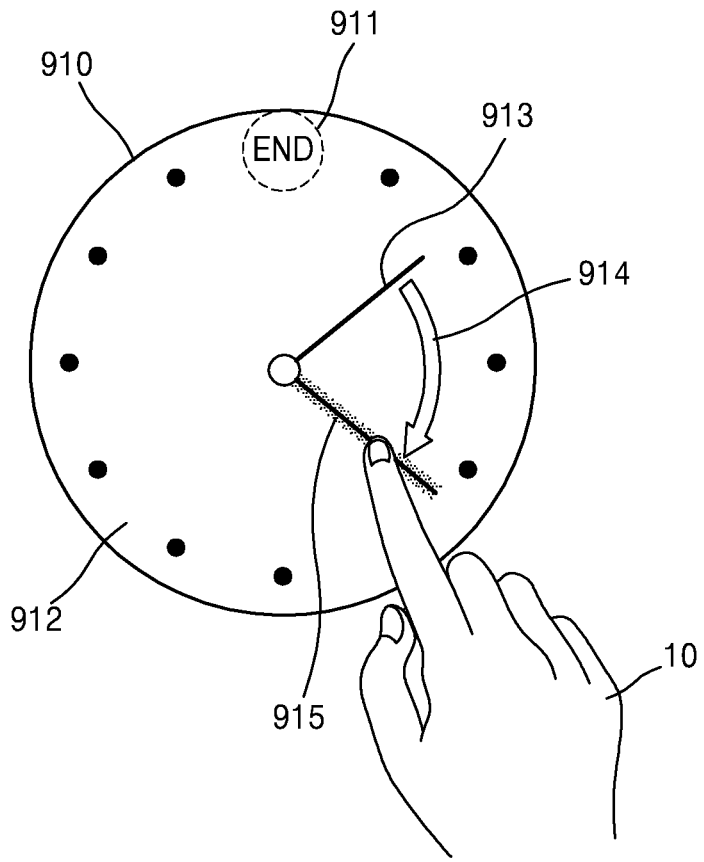

FIG. 9 illustrates a clock GUI 910 for controlling the electronic apparatus 100 to control an operation of an external device according to an embodiment of the disclosure.

The clock GUI 910 displayed on the electronic apparatus 100 may include an indication object 913 moving on an indication area 912 with respect to a center point. The electronic apparatus 100 may display, on the clock GUI 910, time information related to an operation of the external device interoperating with the electronic apparatus 100. The indication object 913 may indicate a partial area distant from a reference line by a distance or a degree corresponding to the time information. The reference line may correspond to a line connecting a zero point 911 with the center point on the indication area 912.

A user 10 of the electronic apparatus 100 may control an operation of the external device by moving the indication object 913. For example, the user 10 may move the indication object 913 to a new position 915 along a direction displayed as an arrow 914 of FIG. 9. For example, the electronic apparatus 100 may move the indication object 913, based on a touch and drag input from the user 10 with respect to a touch screen displayed by the clock GUI 910.

The electronic apparatus 100 may adjust a time period related to an operation of the external device, based on a distance or a degree by which the user 10 moves the indication object 913. The electronic apparatus 100 may transmit change time information related to the operation of the external device, based on a user input of moving an indication object by a predetermined distance, and may transmit the changed time information to the external device. The electronic apparatus 100 may display the indication object at a position moved by the predetermined distance or predetermined degrees based on the user input. The electronic apparatus 100 may add or decrease an operation time period of the external device, or may adjust a time period scheduled for the external device to perform a predetermined operation, based on the user input of moving the indication object.

For example, the electronic apparatus 100 may display a clock GUI displaying a time period left for a washing machine to end its operating function. The electronic apparatus 100 may add or decrease an operation time period of the washing machine, based on a user input of dragging the indication object.

As another example, the electronic apparatus 100 may display a clock GUI indicating a time scheduled for lighting equipment to turn on or off at a particular time. The electronic apparatus 100 may advance or postpone the scheduled time with respect to the lighting equipment, based on a user input of dragging the indication object.

As another example, the electronic apparatus 100 may manage a time period in which cooking equipment such as an electric rice cooker operates. The electronic apparatus 100 may display a clock GUI indicating a time set for the cooking equipment to cook food. For example, the electronic apparatus 100 may display a clock GUI indicating that the electric rice cooker has been set to keep cooked rice warm during a predetermined time. The electronic apparatus 100 may adjust an operation time period of the cooking equipment in real time, based on a user input of dragging the indication object.

Figure 10:
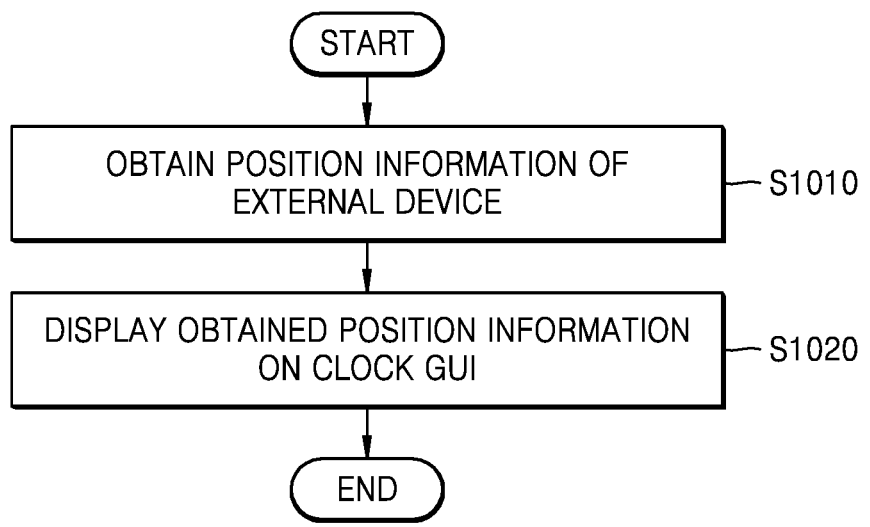
FIG. 10 is a flowchart of a method of displaying position information of an external device, the method being performed by the electronic apparatus according to an embodiment of the disclosure.

FIG. 10 is a flowchart of a method of displaying position information of an external device, the method being performed by the electronic apparatus 100 according to an embodiment of the disclosure.

In operation S1010, the electronic apparatus 100 may obtain position information of at least one external device.

Before the electronic apparatus 100 obtains the position information, the electronic apparatus 100 may request the at least one external device for transmission of the position information, and may receive a response permitting the transmission of the position information from the at least one external device.

For example, position information of an external device may include at least one of information about at which position of interest from among preset positions of interest the external device is positioned, information about in which direction the external device is positioned with respect to the electronic apparatus 100, and information about a distance from the electronic apparatus 100 to the external device. For example, the position information of the external device may include GPS information received by the external device.

In operation S1020, the electronic apparatus 100 may display the obtained position information on a clock GUI.

The clock GUI may include an indication area and at least one indication object moving on the indication area. The at least one indication object may indicate the at least one external device. The at least one indication object may rotate with respect to a center point included in the indication area. The at least one indication object may indicate the position information obtained in operation S1010, by indicating a predetermined point or an area from among a plurality of partial areas included in the indication area.

The electronic apparatus 100 may indicate the information about at which position of interest from among preset positions of interest the external device is positioned. The plurality of partial areas included in the indication area of the clock GUI may respectively correspond to the preset positions of interest. The at least one indication object may indicate that the at least one external device corresponding to the at least one indication object is positioned at a position of interest which corresponds to the area indicated by the at least one indication object.

As another example, the electronic apparatus 100 may indicate the information about in which direction the external device is positioned with respect to the electronic apparatus 100. The plurality of partial areas included in the indication area of the clock GUI may indicate directions relative to the electronic apparatus 100. The at least one indication object may indicate that the at least one external device corresponding to the at least one indication object is positioned with respect to the electronic apparatus 100 in a direction corresponding to the area indicated by the at least one indication object, by indicating the area from among the plurality of partial areas.

The clock GUI may indicate the direction of the external device which is relative to the electronic apparatus 100, but may further indicate a distance from the electronic apparatus 100 to the external device. The at least one indication object of the clock GUI may further indicate the distance from the electronic apparatus 100 to the external device. For example, the electronic apparatus 100 may indicate the distance from the electronic apparatus 100 to the external device by changing a length of the at least one indication object, based on the distance from the electronic apparatus 100 to the external device.

The electronic apparatus 100 may display a clock GUI including a plurality of indication objects respectively indicating a plurality of external devices. Each of the indication objects may indicate position information of an external device corresponding to an indication object by indicating a predetermined point or an area from among the plurality of partial areas included in the indication area. The electronic apparatus 100 may differently display the indication objects included in the clock GUI, based on at least one of a color, brightness, a pattern, a symbol, a letter, a size, and a form. The electronic apparatus 100 may apply at least one of a color, brightness, a pattern, a symbol, a letter, a size, and a form, which indicates the external device, to each of the indication objects, and then the user may identify which indication object indicates which external device.

Figure 11:
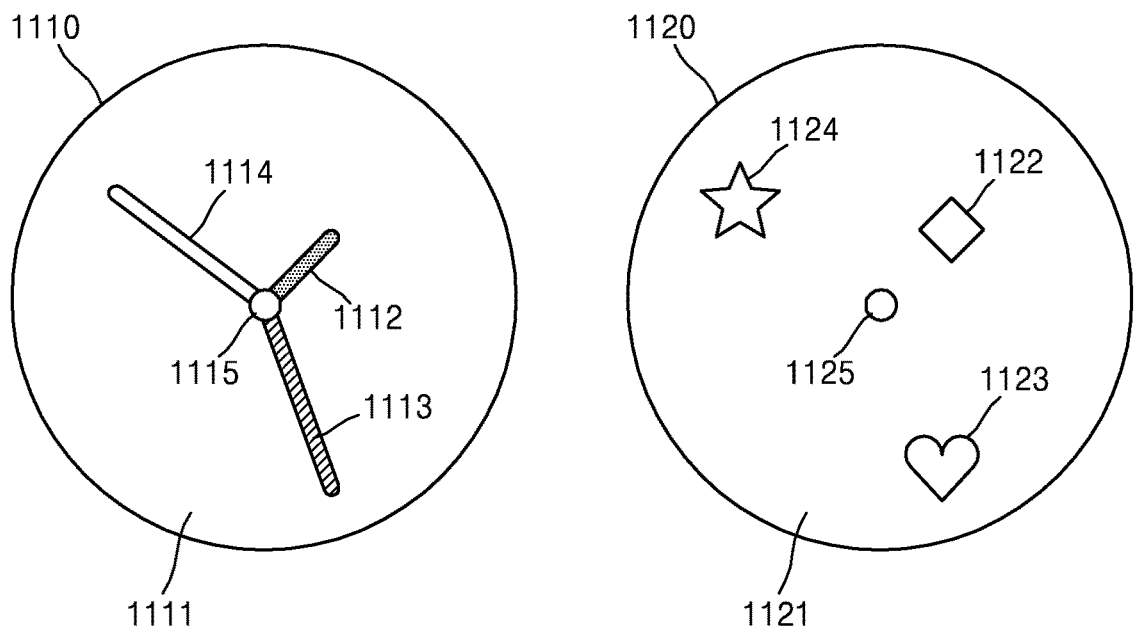
FIGS. 11, 12, and 13 illustrate examples of a clock GUI of the electronic apparatus, the clock GUI displaying position information of an external device according to various embodiments of the disclosure.
Figure 12:
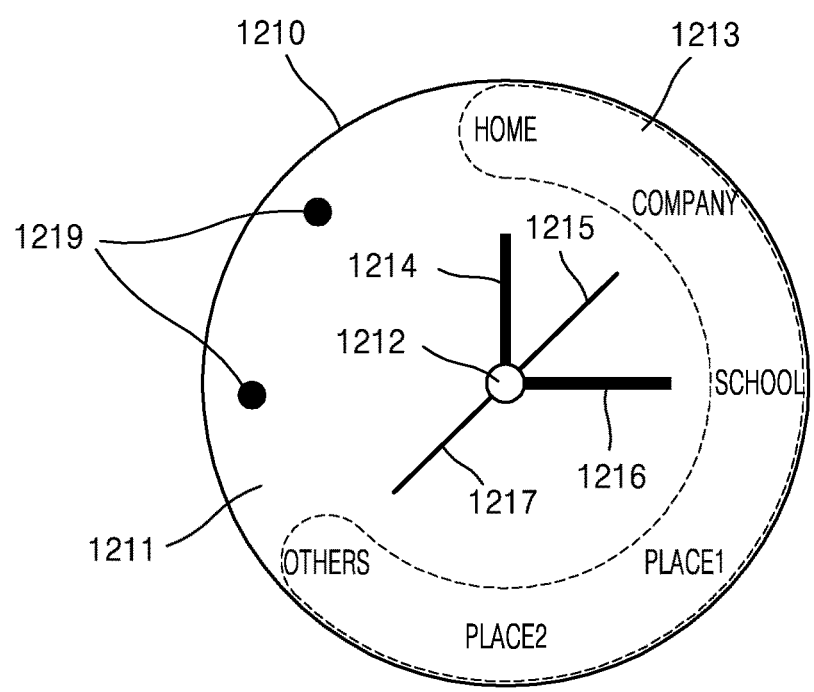
Figure 13:
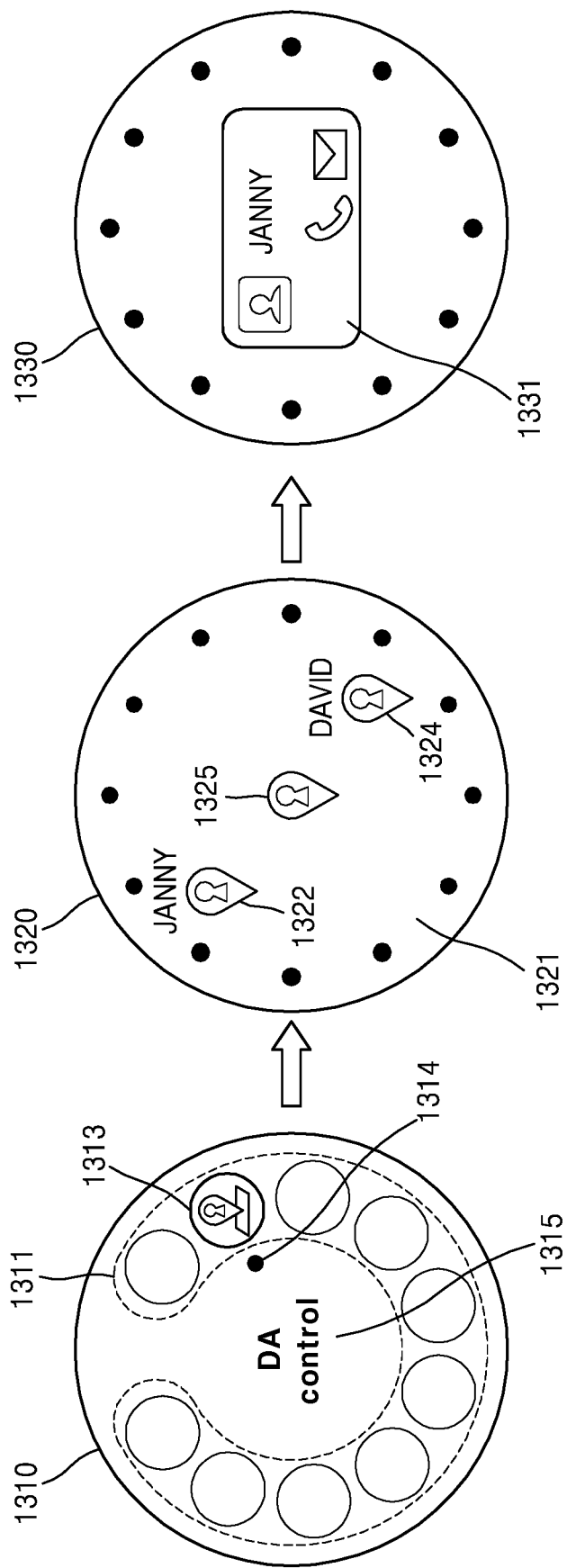

FIGS. 11, 12, and 13 illustrate examples of a clock GUI of the electronic apparatus 100, the clock GUI displaying position information of an external device according to various embodiment of the disclosure.

As illustrated in FIG. 11, the electronic apparatus 100 may variously display, on the clock GUI, information related to a position of the external device.

For example, a clock GUI 1110 generated by the electronic apparatus 100 may include indication objects 1112, 1113, and 1114 which rotate on an indication area 1111 with respect to a center point 1115. The indication objects 1112, 1113, and 1114 may respectively indicate a plurality of pieces of information about in which directions external devices are positioned with respect to the electronic apparatus 100. The indication objects 1112, 1113, and 1114 may respectively indicate positions of different external devices.

For example, as illustrated in the clock GUI 1110, the electronic apparatus 100 may indicate that the indication objects 1112, 1113, and 1114 correspond to the different external devices, by differently displaying colors of the indication objects 1112, 1113, and 1114. In addition, the electronic apparatus 100 may indicate distances from the electronic apparatus 100 to the different external devices, based on lengths of the indication objects 1112, 1113, and 1114. The electronic apparatus 100 may display the indication object 1112 to be short, the indication object 1112 indicating position information of an external device that is positioned relatively close to the electronic apparatus 100. The electronic apparatus 100 may display the indication objects 1113 and 1114 to be long, the indication objects 1113 and 1114 indicating two pieces of position information of external devices that are positioned relatively remote from the electronic apparatus 100.

As illustrated in the clock GUI 1110, the electronic apparatus 100 may display a clock GUI including indication objects having forms of hour and minute hands of an analog clock. However, the embodiment is not limited thereto, and an indication object may have various forms.

As another example, a clock GUI 1120 generated by the electronic apparatus 100 may include indication objects 1122, 1123, and 1124 which rotate on an indication area 1121 with respect to a center point 1125. The indication objects 1122, 1123, and 1124 may respectively indicate a plurality of pieces of information about in which directions external devices are positioned with respect to the electronic apparatus 100. The indication objects 1122, 1123, and 1124 may respectively indicate positions of different external devices.

For example, as illustrated in the clock GUI 1120, the electronic apparatus 100 may indicate that the indication objects 1122, 1123, and 1124 correspond to the different external devices, by differently displaying forms of the indication objects 1122, 1123, and 1124. In addition, the electronic apparatus 100 may indicate distances from the electronic apparatus 100 to the different external devices, based on distances from the center point 1125 to the indication objects 1122, 1123, and 1124.

The electronic apparatus 100 may display the indication object 1122 to be close to the center point 1125, the indication object 1122 indicating position information of an external device that is positioned relatively close to the electronic apparatus 100. The electronic apparatus 100 may display the indication objects 1123 and 1124 to be remote from the center point 1125, the indication objects 1123 and 1124 indicating two pieces of position information of external devices that are positioned relatively remote from the electronic apparatus 100.

As illustrated in FIG. 12, the electronic apparatus 100 may display, on a clock GUI 1210, information related to a position of an external device.

The clock GUI 1210 generated by the electronic apparatus 100 may include indication objects 1214, 1215, 1216, and 1217 which rotate on an indication area 1211 with respect to a center point 1212. The indication objects 1214, 1215, 1216, and 1217 may each indicate information about at which position of interest from among preset positions of interest an external device is positioned. The indication objects 1214, 1215, 1216, and 1217 may respectively indicate positions of different external devices.

The electronic apparatus 100 may display the clock GUI 1210 including a list 1213 of the preset positions of interest. A plurality of partial areas included in the indication area 1211 of the clock GUI 1210 may respectively correspond to the preset positions of interest included in the list 1213. The indication objects 1214, 1215, 1216, and 1217 may each indicate one of the plurality of partial areas, thereby indicating that an external device corresponding to each indication object is positioned at a position of interest corresponding to the area indicated by the indication object. The list 1213 may include letters, symbols, or images indicating the preset positions of interest. As an example, the clock GUI 1210 of FIG. 12 displays the list 1213 including names of the preset positions of interest, but the embodiment is not limited thereto. A clock GUI according to another embodiment may include a list of positions of interest, the list including an image, a symbol, or a letter indicating each of the positions of interest.

Referring to the clock GUI 1210, an external device corresponding to the indication object 1214 is positioned at "home", an external device corresponding to the indication object 1215 is positioned at "company", an external device corresponding to the indication object 1216 is positioned at "school", and an external device corresponding to the indication object 1217 is positioned at "others". For example, in the case that a position of an external device does not correspond to a position of interest, the electronic apparatus 100 may display the external device to be positioned at "others". The electronic apparatus 100 may add positions of interest to the list 1213, in response to a user input of selecting icons 1219 included in the clock GUI 1210.

The electronic apparatus 100 may provide position information of an external device via a clock GUI, thereby allowing a user of the electronic apparatus 100 to conveniently check a position of another person in real time, the other person having the external device. For example, the user of the electronic apparatus 100 may conveniently check in real time positions of family members by setting the clock GUI to display a plurality of pieces of position information of external devices of the family members.

FIG. 13 illustrates a UI displayed by the electronic apparatus 100 so as to display time information related to position information and an operation of an external device according to an embodiment of the disclosure.

The electronic apparatus 100 may display a screen 1310 including a list 1311 from which one is selected from among applications to be executed by the electronic apparatus 100 or functions to be provided by the electronic apparatus 100. The list 1311 may include a plurality of icons respectively corresponding to the applications to be executed by the electronic apparatus 100 or the functions to be provided by the electronic apparatus 100.

The electronic apparatus 100 may receive a user input of selecting an icon 1313 from among a plurality of icons included in the list 1311. The electronic apparatus 100 may display, on the screen 1310, a pointer 1314 indicating the user-selected icon 1313, based on a user input. The electronic apparatus 100 may display, on the screen 1310, a name 1315 of the user-selected icon 1313, based on a user input.

The electronic apparatus 100 may display a clock GUI 1320 displaying information about positions of a plurality of external devices, in response to the user input of selecting the icon 1313. The electronic apparatus 100 may display position information of external devices only that permitted transmission of the position information.

The clock GUI 1320 may include a center point 1325 indicating a position of the electronic apparatus 100, and indication objects 1322 and 1324 that rotate on an indication area 1321 and display positions of external devices. The indication objects 1322 and 1324 may indicate two pieces of information about in which directions the external devices are positioned with respect to the electronic apparatus 100. The indication objects 1322 and 1324 may respectively indicate the positions of the external devices that are different from each other.

The electronic apparatus 100 may differently display the indication objects 1322 and 1324, based on at least one of a color, brightness, a pattern, a symbol, a letter, a size, and a form of each of the indication objects 1322 and 1324. The electronic apparatus 100 may apply at least one of a color, brightness, a pattern, a symbol, a letter, a size, and a form, which indicates the external device, to each of the indication objects 1322 and 1324, and then a user may identify which indication object indicates which external device.

The electronic apparatus 100 may receive a user input of selecting the indication object 1322 from among the indication objects 1322 and 1324. The indication object 1322 may indicate an external device carried by a user named "JANNY".

The electronic apparatus 100 may display detailed information related to an external device, in response to a user input of selecting the external device. The electronic apparatus 100 may display a screen 1330 including a pop-up window 1331 displaying detailed information, in response to the user input of selecting the indication object 1322. The detailed information related to the external device may include at least one of a name of the external device, user information of the external device, a phone number of the external device, and a category of a contact list in which the phone number of the external device is stored. The user information of the external device may include at least one of a name of a user, an address of the user, a photo of the user, an e-mail address of the user, and a contact group to which the user belongs.

The pop-up window 1331 may include at least one icon for making a phone call or sending a text message to the external device. In response to a user input of selecting the at least one icon included in the pop-up window 1331, the electronic apparatus 100 may make a phone call to the external device or may send a text message to the external device.

Accordingly, the electronic apparatus 100 may provide position information of an external device via a clock GUI, thereby allowing a user of the electronic apparatus 100 to conveniently check a position of another person in real time, the other person having the external device. In addition, the electronic apparatus 100 may provide detailed information of the external device or a UI for contacting the external device, in response to a user input with respect to the clock GUI, such that the user may easily obtain information of the other person and conveniently make a contact. For example, when the user of the electronic apparatus 100 waits for a friend in an appointed place, the user may conveniently check a position of the friend in real time based on an indication object indicating a device of the friend, and may make a contact with the friend by conveniently obtaining a contact address of the friend by selecting the indication object.

Figure 14:
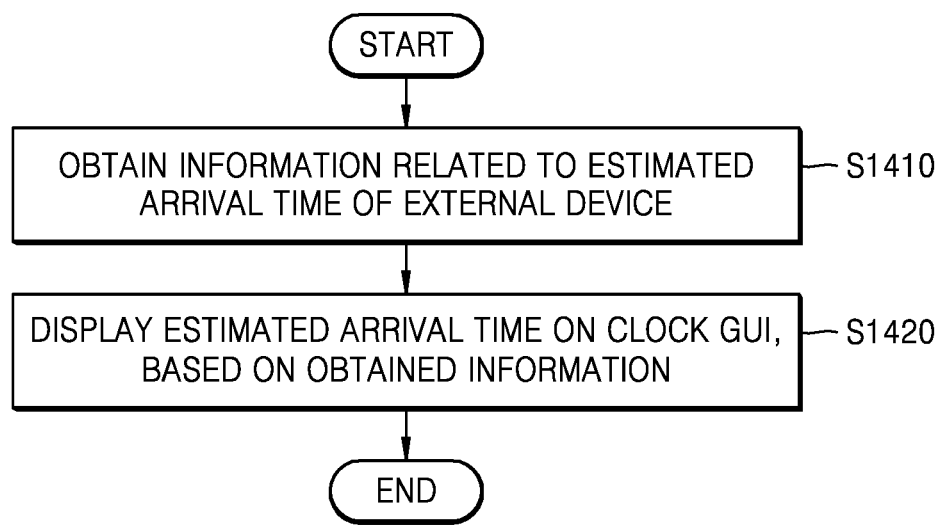
FIG. 14 is a flowchart of a method of displaying information related to an estimated arrival time of an external device, the method being performed by the electronic apparatus 100 according to an embodiment of the disclosure.

FIG. 14 is a flowchart of a method of displaying information related to an estimated arrival time of an external device, the method being performed by the electronic apparatus 100 according to an embodiment of the disclosure.

In operation S1410, the electronic apparatus 100 may obtain information related to an estimated arrival time of at least one external device.

Before the electronic apparatus 100 obtains the information related to an estimated arrival time, the electronic apparatus 100 may request the at least one external device for transmission of the information, and may receive a response permitting the transmission of the information from the at least one external device.

For example, the information related to an estimated arrival time may include at least one of an estimated arrival time of the at least one external device, a position of the at least one external device, a moving speed of the at least one external device, and a type of transportation that a user of the at least one external device uses to move to another place. For example, information about the position of the at least one external device may include GPS information received by the at least one external device.

In operation S1420, the electronic apparatus 100 may display the estimated arrival time of the at least one external device on a clock GUI, based on the obtained information.

The clock GUI may include an indication area and at least one indication object moving on the indication area. The at least one indication object may indicate the at least one external device. The at least one indication object may rotate with respect to a center point included in the indication area. The at least one indication object may indicate the estimated arrival time of the at least one external device by indicating a predetermined point or an area from among a plurality of partial areas included in the indication area.

The electronic apparatus 100 may calculate the estimated arrival time of the at least one external device, based on the information obtained in operation S1410. The electronic apparatus 100 may calculate the estimated arrival time of the at least one external device, based on at least one of the position of the at least one external device, the moving speed of the at least one external device, and the type of the transportation that the user of the at least one external device uses to move to another place.

The electronic apparatus 100 may further obtain new information related to the estimated arrival time of the at least one external device, and may display the clock GUI updated based on the obtained new information. The at least one indication object may indicate that the estimated arrival time is imminent, by moving in a counterclockwise direction according to flow of time.

The electronic apparatus 100 may display a clock GUI including a plurality of indication objects respectively indicating a plurality of external devices. Each of the indication objects indicates a predetermined point or an area from among the plurality of partial areas included in the indication area, such that information about the estimated arrival time of the at least one external device corresponding to one of the indication objects may be displayed. The electronic apparatus 100 may differently display the indication objects included in the clock GUI, based on at least one of a color, brightness, a pattern, a symbol, a letter, a size, and a form. The electronic apparatus 100 may apply at least one of a color, brightness, a pattern, a symbol, a letter, a size, and a form, which indicates the external device, to each of the indication objects, and then a user may identify which indication object indicates which external device.

Figure 15:
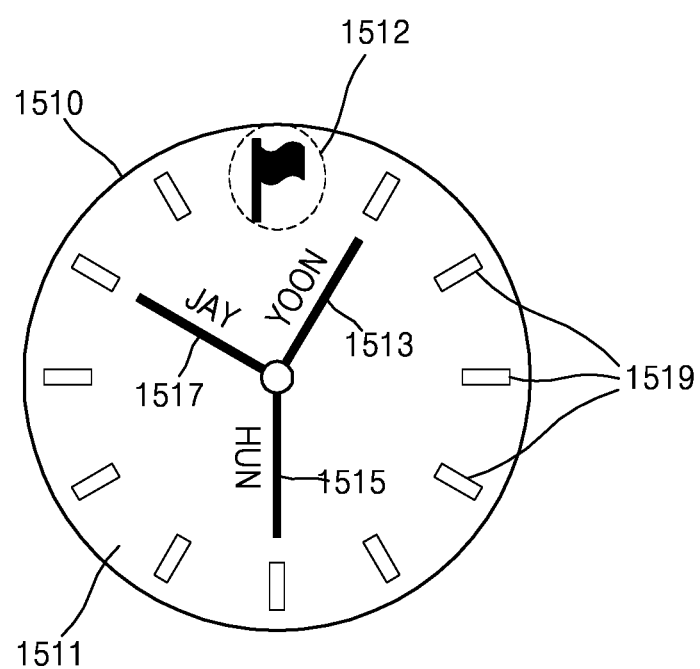
FIG. 15 illustrates a clock GUI of the electronic apparatus which displays an estimated arrival time of an external device according to an embodiment of the disclosure.

FIG. 15 illustrates a clock GUI 1510 of the electronic apparatus 100 which displays an estimated arrival time of an external device according to an embodiment of the disclosure.

The clock GUI 1510 generated by the electronic apparatus 100 may include indication objects 1513, 1515, and 1517 moving on an indication area 1511 with respect to a center point.

The indication objects 1513, 1515, and 1517 may respectively indicate partial areas distant from a reference line by respective distances or degrees corresponding to respective estimated arrival times of external devices. The reference line may be a line connecting a zero point 1512 with the center point on the indication area 1511.

The indication area 1511 of the clock GUI 1510 may indicate 60 minutes, and 60 partial areas composing the indication area 1511 may each indicate 1 minute. The indication area 1511 may include a marking or a number indicating a time corresponding to a point or at least one area from among a plurality of partial areas. The indication area 1511 may include markings 1519 that mark 12 partial areas by 5-minute intervals. However, time intervals indicated by the plurality of partial areas are not limited to the aforementioned example, and may each be variously set as 1 second, several seconds, 1 minute, several minutes, 10 minutes, several minutes, 1 hour, several hours, 1 day, several days, or the like.

The indication object 1513 of the clock GUI 1510 indicates a partial area distant from the reference line by 30 degrees. The indication object 1513 may indicate an external device carried by a user named "YOON". The clock GUI 1510 may indicate that an estimated arrival time of the external device corresponding to the indication object 1513 is within 5 minutes. The clock GUI 1510 may indicate that 5 minutes are left until the external device corresponding to the indication object 1513 arrives at an appointed place. The reference line may indicate a time at which the external device is estimated to arrive at the appointed place. The appointed place may be a preset place or a position of the electronic apparatus 100.

The indication object 1515 of the clock GUI 1510 indicates a partial area distant from the reference line by 180 degrees. The indication object 1515 may indicate an external device carried by a user named "HUN". The clock GUI 1510 may indicate that an estimated arrival time of the external device corresponding to the indication object 1515 is within 30 minutes. The clock GUI 1510 may indicate that 30 minutes are left until the external device corresponding to the indication object 1515 arrives at the appointed place.

The indication object 1517 of the clock GUI 1510 indicates a partial area distant from the reference line by 300 degrees. The indication object 1517 may indicate an external device carried by a user named "JAY". The clock GUI 1510 may indicate that an estimated arrival time of the external device corresponding to the indication object 1517 is within 50 minutes. The clock GUI 1510 may indicate that 50 minutes are left until the external device corresponding to the indication object 1517 arrives at the appointed place.

FIG. 15 illustrates an example in which only information about the estimated arrival time of the external device is displayed, but the embodiment is not limited thereto. The electronic apparatus 100 may display both the information about the estimated arrival time of the external device and information about a position of the external device. The electronic apparatus 100 may further display an indication object indicating the position of the external device along with the indication object indicating the estimated arrival time of the external device.

The electronic apparatus 100 may apply at least one of a color, brightness, a pattern, a symbol, a letter, a size, and a form, which indicates the external device, to both the indication object indicating the estimated arrival time of the external device and the indication object indicating the position, and then a user may identify which indication object indicates which external device.

The electronic apparatus 100 may receive a user input of selecting an indication object from among the indication objects 1513, 1515, and 1517. The electronic apparatus 100 may display detailed information related to the selected external device, in response to the user input of selecting the external device. The electronic apparatus 100 may display a screen including a pop-up window displaying the detailed information related to the selected external device. For example, the electronic apparatus 100 may display the screen 1330 shown in FIG. 13, as the screen including the pop-up window displaying the detailed information. The detailed information related to the external device may include at least one of a name of the external device, user information of the external device, a phone number of the external device, and a category of a contact list in which the phone number of the external device is stored. The user information of the external device may include at least one of a name of a user, an address of the user, a photo of the user, an e-mail address of the user, and a contact group to which the user belongs.

The pop-up window may include at least one icon for making a phone call or sending a text message to the external device. In response to a user input of selecting the at least one icon included in the pop-up window, the electronic apparatus 100 may make a phone call to the external device or may send a text message to the external device.

Accordingly, the electronic apparatus 100 may provide an estimated arrival time of the external device via a clock GUI, thereby allowing a user of the electronic apparatus 100 to conveniently check the estimated arrival time of another person in real time, the other person carrying the external device. In addition, the electronic apparatus 100 may provide the detailed information of the external device or a UI for contacting the external device, in response to a user input with respect to the clock GUI, such that the user may easily obtain information of the other person and conveniently make a contact.

For example, when the user of the electronic apparatus 100 waits for a friend in an appointed place, the user may conveniently check a position of the friend in real time based on an indication object indicating a device of the friend, and make a contact with the friend by conveniently obtaining a contact address of the friend corresponding to the indication object by selecting the indication object.

With reference to FIGS. 14 and 15, the method, performed by the electronic apparatus 100, of displaying the estimated arrival time of the external device is described above. The electronic apparatus 100 may display a clock GUI that displays an estimated arrival time of the electronic apparatus 100 related to destination.

Figure 16:
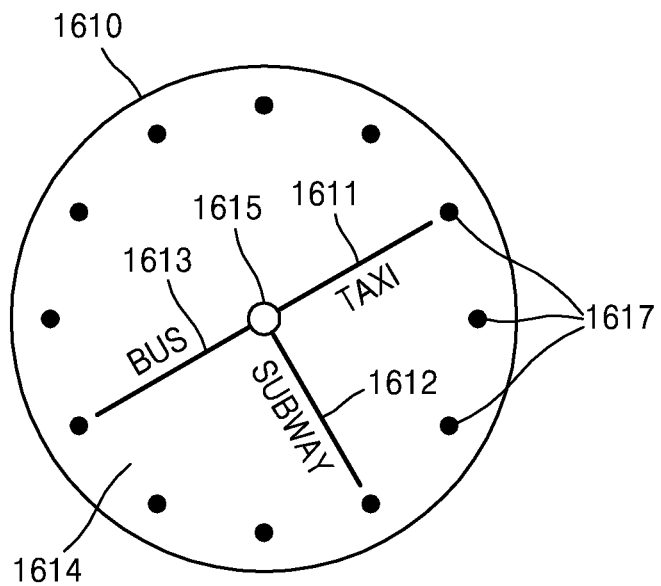
FIG. 16 illustrates an example of a clock GUI that displays an estimated arrival time of the electronic apparatus according to an embodiment of the disclosure.

FIG. 16 illustrates an example of a clock GUI 1610 that displays an estimated arrival time of the electronic apparatus 100 according to an embodiment of the disclosure.

The electronic apparatus 100 may obtain information about at least one of a position of the electronic apparatus 100, a moving speed of the electronic apparatus 100, a type of transportation that a user of the electronic apparatus 100 uses to move to another place, destination of the electronic apparatus 100, and a time period estimated for a user of the electronic apparatus 100 to arrive at destination by using various forms of transportation. The electronic apparatus 100 may obtain the information from an external device, a server, or the user.

As illustrated in FIG. 16, the electronic apparatus 100 may display, on the clock GUI 1610, estimated arrival times depending on the transportation to be used, based on the obtained information.

The clock GUI 1610 generated by the electronic apparatus 100 may include indication objects 1611, 1612, and 1613 moving on an indication area 1614 with respect to a center point 1615.

Each of the indication objects 1611, 1612, and 1613 may indicate a partial area distant from a reference line by a distance or a degree corresponding to an estimated arrival time of an external device. The reference line may correspond to a line connecting a zero point with the center point 1615 on the indication area 1614.

Each of a plurality of partial areas included in the indication area 1614 may indicate a predetermined time unit. The indication area 1614 may include a marking or a number indicating a time corresponding to a predetermined point or at least one area from among the plurality of partial areas. For example, the indication area 1614 of the clock GUI 1610 may indicate 60 minutes, and 60 partial areas composing the indication area 1614 may each indicate 1 minute. The indication area 1614 may include markings 1617 that mark 12 partial areas by 5-minute intervals.

The indication object 1611 of the clock GUI 1610 indicates a partial area distant from the reference line by 60 degrees. The indication object 1611 may indicate an estimated arrival time of a case in which a user moves to destination by using "taxi" as transportation. The clock GUI 1610 may indicate that the estimated arrival time to the destination is within 10 minutes in the case that the user uses a taxi that is transportation corresponding to the indication object 1611. The reference line may indicate a time at which the electronic apparatus 100 is estimated to arrive at the destination.

The indication object 1612 of the clock GUI 1610 indicates a partial area distant from the reference line by 150 degrees. The indication object 1612 may indicate an estimated arrival time of a case in which the user moves to the destination by using "subway" as transportation. The clock GUI 1610 may indicate that the estimated arrival time to the destination is within 25 minutes in the case that the user uses subway that is transportation corresponding to the indication object 1612.

The indication object 1613 of the clock GUI 1610 indicates a partial area distant from the reference line by 240 degrees. The indication object 1613 may indicate an estimated arrival time of a case in which the user moves to the destination by using "bus" as transportation. The clock GUI 1610 may indicate that the estimated arrival time to the destination is within 40 minutes in the case that the user uses a bus that is transportation corresponding to the indication object 1613.

Referring to FIG. 16, the clock GUI 1610 may display names of transportation to be adjacent to respective indication objects, such that the user may identify which indication object indicates an estimated arrival time for which form of transportation. However, the embodiment is not limited thereto.

The electronic apparatus 100 may differently display indication objects included in a clock GUI, based on at least one of a color, brightness, a pattern, a symbol, a letter, a size, and a form. The electronic apparatus 100 may apply at least one of a color, brightness, a pattern, a symbol, a letter, a size, and a form, which indicates the transportation means, to each of the indication objects, and then the user may identify which indication object indicates an estimated arrival time for which form of transportation.

The electronic apparatus 100 may allow the user of the electronic apparatus 100 to select a best way from among various ways of going to the destination, by providing, via a clock GUI, information about estimated arrival times caused by various forms of transportation.

For example, the user of the electronic apparatus 100 may input "Gangnam Station" as destination into the electronic apparatus 100. The electronic apparatus 100 may obtain, from an external device or a server, information about transportation to be used in going to the destination and information about an estimated arrival time of a case of going to the destination by using the transportation. The electronic apparatus 100 may display estimated arrival times according to respective forms of transportation. The electronic apparatus 100 may display respective forms of transportation in an order according to a shorter estimated arrival time to the destination. The user may move to the destination by using the best transportation, based on the information provided by the electronic apparatus 100. Accordingly, the electronic apparatus 100 may help the user to efficiently manage a time.

Figure 17:
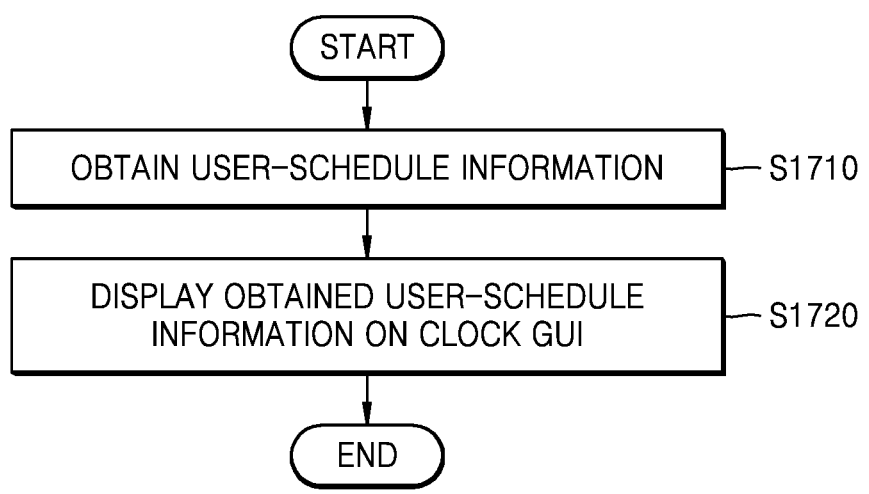
FIG. 17 is a flowchart of a method of displaying user-schedule information related to a schedule of a user, the method being performed by the electronic apparatus according to an embodiment of the disclosure.

FIG. 17 is a flowchart of a method of displaying user-schedule information related to a schedule of a user, the method being performed by the electronic apparatus 100 according to an embodiment of the disclosure.

In operation S1710, the electronic apparatus 100 may obtain the user-schedule information related to the user of the electronic apparatus 100.

The user-schedule information may include information about a task the user has to do during a certain period of time, or an order, periods of time, or time ranges of scheduled events. For example, the electronic apparatus 100 may obtain information about a task the user has to do today, or information about an order and periods of time of events scheduled to occur today.

For example, the electronic apparatus 100 may obtain the user-schedule information from a memory embedded in the electronic apparatus 100. The electronic apparatus 100 may store the user-schedule information in the embedded memory, based on a user input to an application for managing a schedule of the user.

As another example, the electronic apparatus 100 may obtain the user-schedule information from an external device or a server. The electronic apparatus 100 may obtain the user-schedule information stored in the external device registered via a same account as the electronic apparatus 100. The account may refer to identification (ID) and a password of the user, the ID and password being given to the user when the user joins a service for managing a plurality of electronic devices.

In operation S1720, the electronic apparatus 100 may display the obtained user-schedule information on a clock GUI.

The clock GUI may include an indication area and at least one indication object moving on the indication area. The at least one indication object may rotate with respect to a center point included in the indication area. The at least one indication object may indicate the user-schedule information obtained in operation S1710, by indicating a predetermined point or an area from among a plurality of partial areas included in the indication area.

For example, the indication area may display a task the user has to do or a scheduled event, which is included in the schedule of the user. The at least one indication object moving on the indication area may indicate a current time. Each of the plurality of partial areas included in the indication area of the clock GUI may correspond to a task the user has to do or a scheduled event. When a time for the user to do a predetermined task or a time at which a predetermined event is scheduled is imminent, the at least one indication object may rotate to indicate an area or a point close to a partial area that corresponds to the predetermined task or the predetermined event.

As another example, the indication area may indicate a time. The at least one indication object moving on the indication area may indicate a task the user has to do or a scheduled event, which is included in the schedule of the user.

The at least one indication object may indicate a time at which a task or an event which corresponds to the at least one indication object is scheduled, by indicating a predetermined point or an area from among the plurality of partial areas included in the indication area. The at least one indication object may indicate a time at which the task or the event which corresponds to the at least one indication object is scheduled to start. Each of the plurality of partial areas included in the indication area may indicate a preset time unit. The indication area may indicate a time range in which the task the user has to do or the scheduled event which is included in the schedule of the user is performed.

For example, the indication area may include 12 or 24 markings, and partial areas between markings may each indicate 1 hour. However, the time unit indicated by each of the plurality of partial areas is not limited thereto, and may be variously set as 1 second, several seconds, 1 minute, several minutes, 10 minutes, several tens of minutes, 1 hour, several hours, 1 day, several days, etc.

For example, the electronic apparatus 100 may display the clock GUI including a plurality of indication objects respectively indicating a plurality of scheduled tasks or scheduled events. The electronic apparatus 100 may differently display the indication objects included in the clock GUI, based on at least one of a color, brightness, a pattern, a symbol, a letter, a size, and a form. The electronic apparatus 100 may apply at least one of a color, brightness, a pattern, a symbol, a letter, a size, and a form, which indicates the task or event, to each of the indication objects, and then the user may identify which indication object indicates which task or event.

Figure 18:
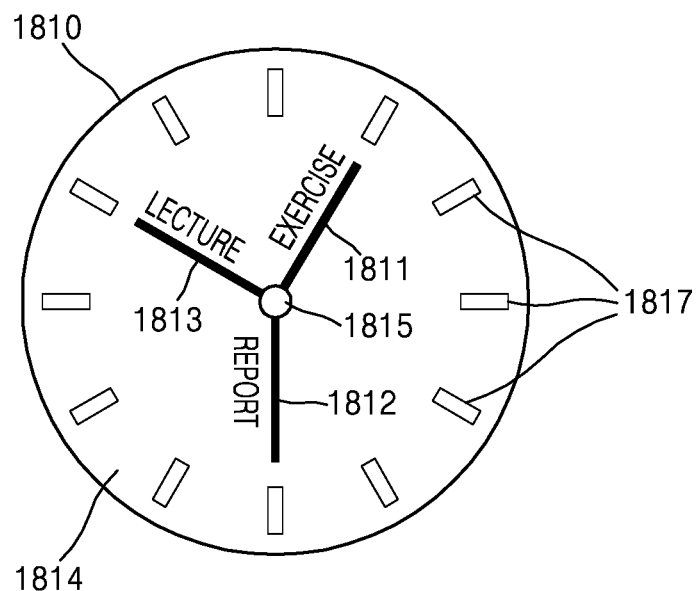
FIGS. 18 and 19 illustrate examples of a clock GUI of the electronic apparatus which displays user-schedule information related to a schedule of a user according to various embodiments of the disclosure.

FIG. 18 illustrates a clock GUI 1810 of the electronic apparatus 100 which displays user-schedule information related to a schedule of a user according to an embodiment of the disclosure.

The clock GUI 1810 generated by the electronic apparatus 100 may include indication objects 1811, 1812, and 1813 moving on an indication area 1814 with respect to a center point 1815.

The indication area 1814 may display a time range in which a task or an event which is included in the schedule of the user is scheduled. The indication objects 1811, 1812, and 1813 moving on the indication area 1814 may indicate tasks or scheduled events included in the schedule of the user, wherein the user has to do the tasks or the events. Each of the indication objects 1811, 1812, and 1813 may indicate a point or a partial area corresponding to a time at which a task or an event is scheduled.

For example, the indication area 1814 of the clock GUI 1810 may indicate 12 hours. 24 partial areas composing the indication area 1814 may each indicate 30 minutes. The indication area 1814 may include a marking or a number indicating a time corresponding to a point or at least one area from among a plurality of partial areas. The indication area 1814 may include markings 1817 that mark 12 partial areas by 1-hour intervals.

The indication object 1811 of the clock GUI 1810 indicates a partial area distant from a reference line by 30 degrees. The reference line may correspond to a boundary line between two partial areas included in the plurality of partial areas. For example, the boundary line may be a line connecting a zero point with a center point on an indication area. The zero point on the indication area may correspond to a point indicating 12 o'clock in an analog clock. The indication object 1811 may indicate a time at which a task of "exercise" is scheduled. The clock GUI 1810 may indicate that a time at which a task corresponding to the indication object 1811 is scheduled is 1 o'clock. Alternatively, the clock GUI 1810 may indicate that a time at which the task corresponding to the indication object 1811 is scheduled is within 1 hour.

The indication object 1812 of the clock GUI 1810 indicates a partial area distant from the reference line by 180 degrees. The indication object 1812 may indicate a time at which a task of "report" is scheduled. The clock GUI 1810 may indicate that a time at which a task corresponding to the indication object 1812 is scheduled is 6 o'clock. Alternatively, the clock GUI 1810 may indicate that a time at which the task corresponding to the indication object 1812 is scheduled is within 6 hours.

The indication object 1813 of the clock GUI 1810 indicates a partial area distant from the reference line by 300 degrees. The indication object 1813 may indicate a time at which a task of "lecture" is scheduled. The clock GUI 1810 may indicate that a time at which a task corresponding to the indication object 1813 is scheduled is 10 o'clock. Alternatively, the clock GUI 1810 may indicate that a time at which the task corresponding to the indication object 1813 is scheduled is within 10 hours.

The electronic apparatus 100 may receive a user input of selecting an indication object from among the indication objects 1811, 1812, and 1813. In response to the user input of selecting the indication object, the electronic apparatus 100 may display detailed information related to a task or an event which corresponds to the selected indication object. The electronic apparatus 100 may display a screen including a pop-up window displaying the detailed information.

Figure 19:
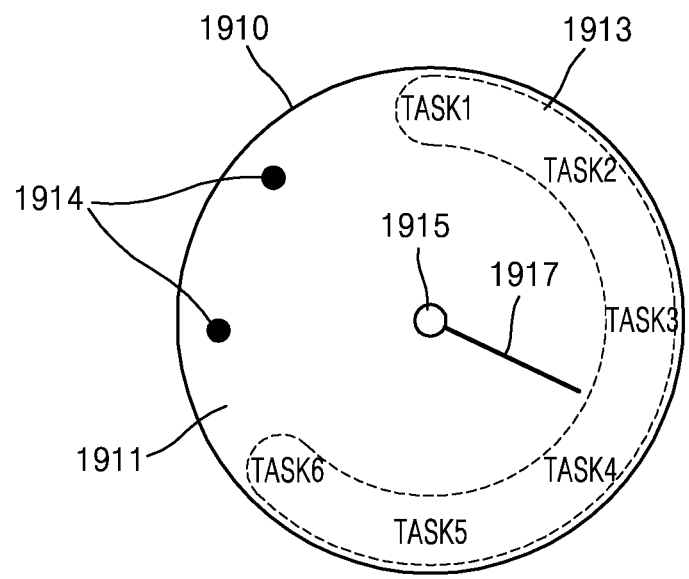

The electronic apparatus 100 may display user-schedule information as illustrated in FIG. 19.

FIG. 19 illustrates a clock GUI 1910 of the electronic apparatus 100 which displays a list of tasks a user has to do or scheduled events, according to an embodiment of the disclosure.

The clock GUI 1910 generated by the electronic apparatus 100 may include an indication object 1917 moving on an indication area 1911 with respect to a center point 1915. The indication object 1917 may indicate a current time.

The electronic apparatus 100 may display the clock GUI 1910 including a list 1913 of tasks a user has to do or scheduled events. A plurality of partial areas included in the indication area 1911 of the clock GUI 1910 may respectively correspond to the tasks or the events included in the list 1913. The indication object 1917 may indicate a task or an event which is scheduled at the current time, by indicating an area from among the plurality of partial areas. The list 1913 may include texts, symbols, or images which indicate the tasks or the events. Referring to an example of FIG. 19, the clock GUI 1910 displays the list 1913 including names of the tasks, but the embodiment is not limited thereto. A clock GUI may include a list including an image, a symbol, or a text indicating each task or each event.

Referring to the clock GUI 1910, the indication object 1917 may indicate that the task the user has to do and that corresponds to the current time is "task 3". When a time at which the user has to perform "task 4" is coming according to flow of time, the indication object 1917 may move toward a partial area corresponding to "task 4". In response to a user input of selecting at least one of icons 1914 on the clock GUI 1910, the electronic apparatus 100 may add a task or an event which is included in the schedule of the user.

The electronic apparatus 100 may provide user-schedule information via a clock GUI, such that the user of the electronic apparatus 100 may intuitively check information about a time at which a task or an event is scheduled.

In each of FIGS. 2, 4 to 9, 11 to 13, 15, 16, 18, and 19, a clock GUI including a round indication area is illustrated as an example. As illustrated in drawings, the electronic apparatus 100 may display the clock GUI including a round indication area, regardless of a form factor of the electronic apparatus 100. The electronic apparatus 100 may display the round clock GUI having an appropriate size, regardless of a form factor of a display of the electronic apparatus 100.

For example, the electronic apparatus 100 may display a round clock GUI whose size is equal to a size of an entire screen of a round display of the electronic apparatus 100. Alternatively, for example, the electronic apparatus 100 may display a round clock GUI whose size is smaller than the size of the screen of the round display of the electronic apparatus 100, or may display a round clock GUI on a display of the electronic apparatus 100 which is not round. The electronic apparatus 100 may apply a background image to a margin area of the screen of the display, wherein the clock GUI is not displayed on the margin area and the background image is predetermined or is determined based on a user input. Alternatively, the electronic apparatus 100 may display a control UI for controlling the electronic apparatus 100 or an external device, on a margin area of the screen of the display on which the clock GUI is not displayed.

For example, as illustrated in FIG. 5, the electronic apparatus 100 may display, on the clock GUI 510, the time information related to content reproduced by the external device or the electronic apparatus 100. When the screen of the display has a margin area other than an area on which the clock GUI 510 is displayed, the electronic apparatus 100 may display, on the margin area, an image related to the reproduced content or a control UI related to reproduction of the content.

Alternatively, for example, as illustrated in FIG. 7, the electronic apparatus 100 may display, on the clock GUI 710, the time information related to the operation of the washing machine. When the screen of the display has a margin area other than an area on which the clock GUI 810 is displayed, the electronic apparatus 100 may display, on the margin area, a UI for adding or decreasing a time related to the operation, or a UI for controlling a stop or a start of the operation.

However, a clock GUI displayed by the electronic apparatus 100 is not limited to the round clock GUI illustrated in drawings.

The electronic apparatus 100 may change a form of a clock GUI based on a form of the electronic apparatus 100. For example, the electronic apparatus 100 may generate and display a clock GUI including an indication area whose form is equal to the form of the electronic apparatus 100. Based on a ratio of a height to a width of a display of the electronic apparatus 100, the electronic apparatus 100 may generate and display a clock GUI to which a ratio of a height to a width of the display is applied. For example, the clock GUI to which the ratio of a height to a width of the display is applied may refer to a clock GUI that has a ratio of a height to a width which is the same as the ratio of a height to a width of the display, or that has a ratio of a height to a width which is adjusted from the ratio of a height to a width of the display by a predetermined rate. A clock GUI generated by the electronic apparatus 100 may include an indication object rotating with respect to a center point included in an indication area, regardless of a form of the indication area of the clock GUI.

Hereinafter, configurations of the electronic apparatus 100 will now be described. Respective configurations of the electronic apparatus 100 to be described below may perform respective operations of the method of displaying information, the method being performed by the electronic apparatus 100 and described above with reference to FIG. 3, 10, 14, or 17.

Figure 20:
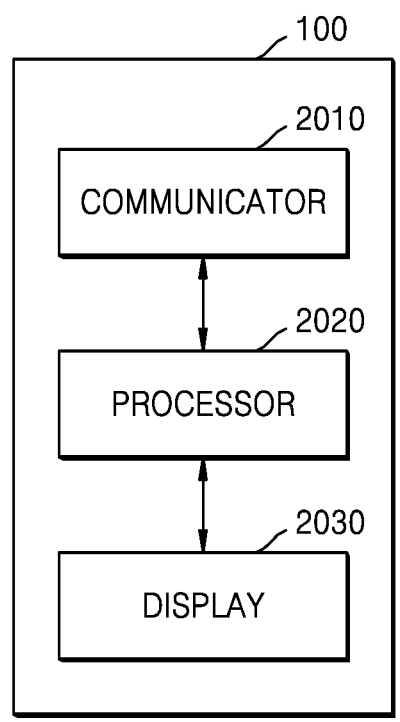
FIG. 20 is a block diagram of the electronic apparatus according to an embodiment of the disclosure.
Figure 21:
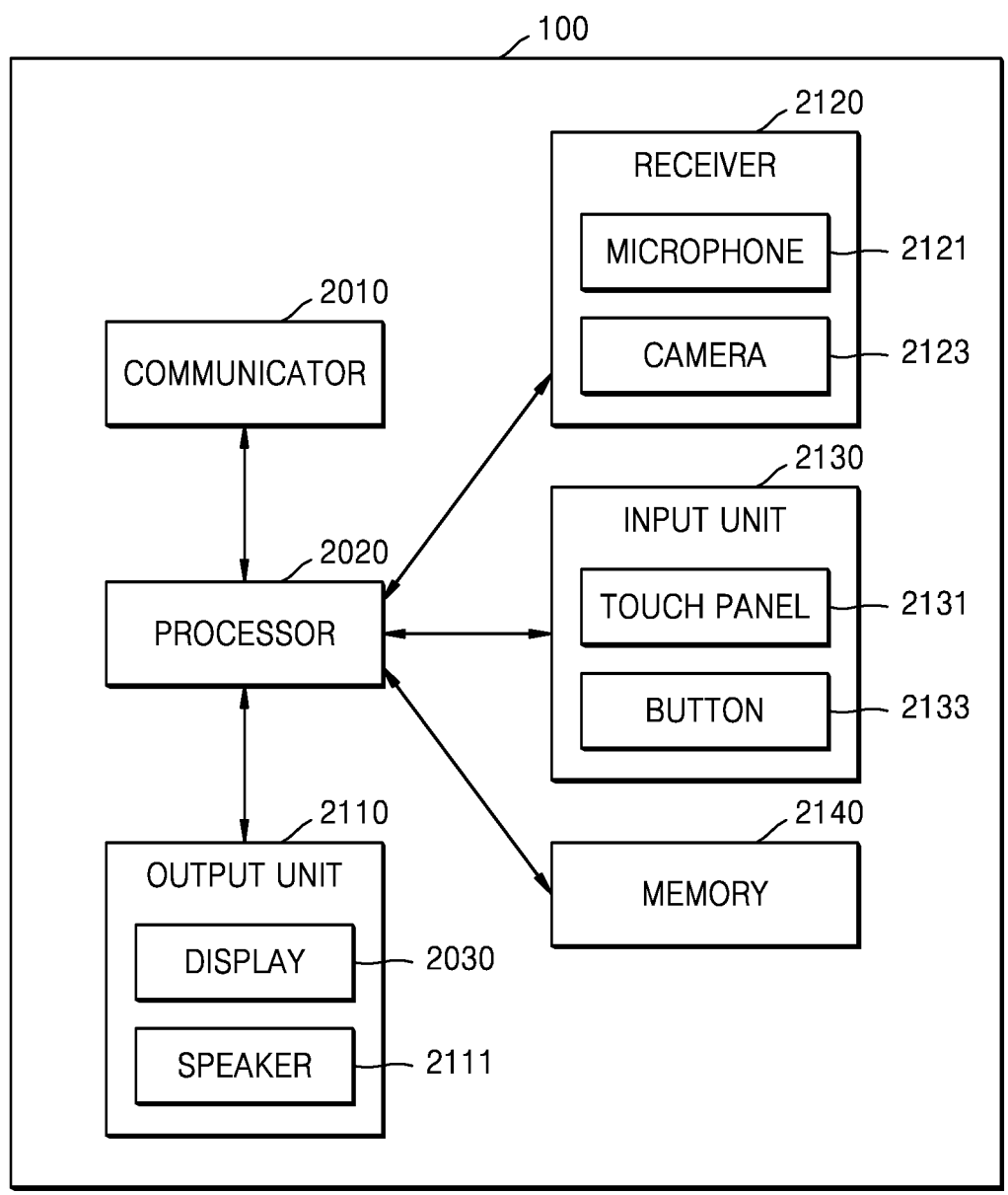
FIG. 21 is a block diagram of the electronic apparatus according to an embodiment of the disclosure.

FIGS. 20 and 21 are block diagrams of the electronic apparatus 100 according to various embodiments of the disclosure.

As illustrated in FIG. 20, the electronic apparatus 100 may include a communicator 2010 (e.g., a transceiver), a processor 2020 (e.g., at least one processor), and a display 2030. However, the electronic apparatus 100 may be embodied with more elements than the elements shown in FIG. 20. As illustrated in FIG. 21, the electronic apparatus 100 may further include at least one of a receiver 2120, an input unit 2130 (e.g., an input device), and a memory 2140.

For example, the electronic apparatus 100 may be a mobile computing apparatus or a non-mobile computing apparatus, which includes, but is not limited to, a wearable device such as a smartwatch, a smartphone, a tablet PC, a PC, a smart TV, a PDA, home appliances, a laptop, a media player, a microserver, a GPS device, an e-book terminal, a terminal for digital broadcasting, navigation, a kiosk, a digital camera, an electronic control device of a vehicle, a CID, or the like.

The communicator 2010 may communicate with an external device or a server via wired communication or wireless communication. The communicator 2010 may obtain, from the external device, information related to the external device. The communicator 2010 may obtain, from the external device or the server, at least one of information related to an operation of the external device, information related to a position of the external device, information related to an estimated arrival time of the external device, and user-schedule information.

Before the communicator 2010 obtains information from the external device, the communicator 2010 may request the external device for transmission of the information, and may receive a response permitting the transmission of the information from the external device. For example, before the communicator 2010 obtains the position information, the communicator 2010 may request the external device for transmission of the position information, and may receive a response permitting the transmission of the position information from the external device.

The communicator 2010 may include a short-range communication module, a wired communication module, a mobile communication module, a broadcasting reception module, or the like.

The processor 2020 may control general operations of the electronic apparatus 100. For example, the processor 2020 may control the communicator 2010 and the display 2030.

The processor 2020 may generate a clock GUI displaying a plurality of pieces of information. For example, the processor 2020 may generate a clock GUI displaying at least one of time information related to an operation of the external device, position information of the external device, an estimated arrival time of the external device, and user-schedule information.

The display 2030 may output information processed by the electronic apparatus 100. The display 2030 may output information as a text, an image, or a moving picture, the method being received from an external source, processed by the processor 2020, or stored in the embedded memory. The display 2030 may display the clock GUI generated by the processor 2020.

The processor 2020 may generate a clock GUI including an indication area and an indication object moving on the indication area. The indication object included in the clock GUI generated by the processor 2020 may indicate various types of information by rotating with respect to a center point included in the indication area, and indicating an area from among a plurality of partial areas included in the indication area.

For example, the clock GUI generated by the processor 2020 may indicate at least one of the time information related to an operation of the external device, the position information of the external device, the estimated arrival time of the external device, and the user-schedule information by indicating an area from among the plurality of partial areas included in the indication area.

For example, the processor 2020 may generate a clock GUI displaying time information related to an operation of the external device. Each of a plurality of partial areas included in an indication area of the generated clock GUI may indicate a predetermined time unit. The processor 2020 may determine a partial area corresponding to a current time from among the plurality of partial areas. For example, the processor 2020 may generate the clock GUI such that an indication object may indicate a partial area that is distant from the partial area corresponding to a current time by a distance corresponding to the obtained time information. Alternatively, for example, the processor 2020 may generate the clock GUI such that the indication object may indicate a partial area that is distant from a reference line by a distance corresponding to the obtained time information.

As another example, the processor 2020 may generate a clock GUI displaying position information of the external device. For example, the generated clock GUI may indicate information about at which position of interest from among preset positions of interest the external device is positioned. Alternatively, for example, the generated clock GUI may indicate information about in which direction the external device is positioned with respect to the electronic apparatus 100.

As another example, the processor 2020 may generate a clock GUI displaying an estimated arrival time of the external device, based on the information related to an estimated arrival time which is obtained by the communicator 2010. The information related to an estimated arrival time may include at least one of an estimated arrival time of the external device, a position of the external device, a moving speed of the external device, and a type of transportation that a user of the external device uses to move to another place. For example, the processor 2020 may calculate the estimated arrival time of the external device, based on at least one of the position of the external device, the moving speed of the external device, and the type of the transportation that the user of the external device uses to move to another place.

The processor 2020 may periodically update the clock GUI. Alternatively, the processor 2020 may update the clock GUI in the case that a refresh input is received from a user. Alternatively, the processor 2020 may update the clock GUI in the case that new information is obtained via the communicator 2010, based on the new information.

For example, the processor 2020 may update the clock GUI displaying the time information related to an operation of the external device, according to flow of time or whenever settings with respect to the external device are changed. Alternatively, for example, the processor 2020 may update the clock GUI displaying a position of the external device, according to flow of time or whenever a position of the external device is changed. Alternatively, for example, the processor 2020 may update the clock GUI displaying an estimated arrival time of the external device, according to flow of time or when a position of the external device is changed.

The processor 2020 may be embodied as hardware and/or software configurations to perform a specific function. Functions performed by the processor 2020 may be implemented by at least one microprocessor or circuit configurations for the functions, respectively. All or some functions performed by the processor 2020 may be implemented by a software module consisting of various programming languages or script languages performed by the processor 2020. Referring to FIGS. 20 and 21, the electronic apparatus 100 includes one processor 2020, but the embodiment is not limited thereto. The electronic apparatus 100 may include a plurality of processors.

An output unit 2110 (e.g., an output device) may output information in the form of at least one of light, sound, an image, and vibration, wherein the information is received from an external source, is processed by the processor 2020, or is stored in the memory 2140. The output unit 2110 may include a speaker 2111 capable of outputting an audio signal, and a display 2030 capable of outputting a text, an image, or a moving picture.

The receiver 2120 may receive an audio signal or a video signal from an external source. For example, the receiver 2120 may receive the audio signal by converting external sound input via a microphone 2121 into electro-acoustic data. Alternatively, for example, the receiver 2120 may receive the video signal from the external source by using a camera 2123. Referring to FIG. 21, the receiver 2120 is included in the electronic apparatus 100, but the receiver 2120 may be embodied in a manner that the receiver 2120 is included in a separate device and is connected to the electronic apparatus 100 in a wired or wireless manner.

The input unit 2130 may receive a user input for controlling the electronic apparatus 100. The input unit 2130 may include, but is not limited to, a touch panel 2131 for receiving a user's touch and a button 2133 for receiving push manipulation by the user. For example, the input unit 2130 may include a wheel for receiving rotation manipulation by the user, a keyboard, a dome switch, or the like. The display 2030 and the touch panel 2131 may form a mutual layer structure and then are formed as a touch screen. The touch screen may be configured to output a text, an image, or a moving picture and to detect a touch input by a user. The touch screen may perform functions of both the output unit 2110 and the input unit 2130.

For example, the display 2030 may further display a list of a plurality of external devices connected or connectable to the electronic apparatus 100. The input unit 2130 may receive, from a user, an input of selecting an external device from the list of a plurality of external devices. In response to the input of selecting the external device, the display 2030 may display a clock GUI displaying information related to the selected external device.

As another example, the input unit 2130 may receive a user input of moving an indication object by a predetermined distance or a predetermined degree. The processor 2020 may change the time information related to an operation of the external device, based in the user input of moving the indication object. The processor 2020 may control the communicator 2010 to transmit the changed time information to the external device. The display 2030 may display the indication object at a position moved by the predetermined degree or the predetermined distance, based on the user input.

As another example, the display 2030 may display a control GUI for controlling the external device. For example, the display 2030 may display the control GUI including at least one of a GUI for controlling the external device to start performing a predetermined operation, a GUI for controlling the external device to pause the performing of the predetermined operation, and a GUI for controlling the external device to end the performing of the predetermined operation. The input unit 2130 may receive, from the user, an input of controlling the external device via the control GUI. The communicator 2010 may transmit the control input received from the user to the external device.

The memory 2140 of FIG. 21 may store at least one of the information received by the communicator 2010 or the receiver 2120, the information processed by the processor 2020, and information input via the input unit 2130. The memory 2140 may store commands to be executed by the processor 2020 to control the electronic apparatus 100.

The memory 2140 may include at least one of storage mediums including a flash memory type storage medium, a hard disk type storage medium, a multimedia card micro type storage medium, a card-type memory (e.g., a secure digital (SD) memory, an extreme digital (xD) memory, etc.), a random-access memory (RAM), a static random-access memory (SRAM), a read-only memory (ROM), an electrically erasable programmable ROM (EEPROM), a programmable ROM (PROM), a magnetic memory, a magnetic disc, and an optical disc.

The various embodiments may be written as computer programs and may be implemented in general-use digital computers that execute the programs using a non-transitory computer-readable recording medium. In addition, a data structure used in the various embodiments can be written in a non-transitory computer-readable recording medium through various means. The various embodiments may be embodied as a recording medium, e.g., a program module to be executed in computers, which include computer-readable instructions. For example, methods that are implemented as software modules or algorithms may be stored as computer readable codes or program instructions executable on a non-transitory computer-readable recording medium.

The computer-readable medium may include any recording medium that may be accessed by computers, volatile and non-volatile medium, and detachable and non-detachable medium. Examples of the computer-readable medium include, but are not limited to, magnetic storage media (e.g., ROM, floppy disks, hard disks, etc.), optical recording media (e.g., compact disc-ROMs (CD-ROMs), or digital versatile discs (DVDs)), etc. In addition, the computer-readable medium may include a computer storage medium and a communication medium.

The non-transitory computer-readable recording media can be distributed over network coupled computer systems, and data stored in the distributed recording media, e.g., a program instruction and code, may be executed by using at least one computer.

The particular implementations shown and described herein are illustrative examples of the disclosure and are not intended to otherwise limit the scope of the disclosure in any way. For the sake of brevity, conventional electronic configurations, control systems, software and other functional aspects of the systems may not be described.

Throughout the specification, terms such as "unit" and "module" indicate a unit for processing at least one function or operation, wherein the unit and the module may be embodied as hardware or software or embodied by combining hardware and software. The unit and the module may be formed to be in an addressable storage medium, or may be implemented by a program to be executed by a processor.

For example, "unit" or "module" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
    a transceiver configured to obtain time information related to an operation of an external device;
    at least one processor configured to generate a clock graphical user interface (GUI) displaying the time information;
    an inputter configured to receive a user input and
    a display configured to display the clock GUI,
    wherein the clock GUI comprises an indication area and an indication object moving on the indication area,
    wherein the indication object rotates with respect to a center point included in the indication area, the indication object indicates the time information by indicating an area from among a plurality of partial areas included in the indication area, and the indication object further indicates a decrease in a time related to the operation currently being performed on the external device by rotating in a counterclockwise direction according to a flow of time,
    wherein, before the display displays the clock GUI, the display further displays a list of a plurality of external devices connected to the electronic apparatus, and
    wherein the inputter is further configured to receive, from a user, an input of selecting the external device from the list of the plurality of external devices.

2. The electronic apparatus of claim 1, wherein the time information related to the operation currently being performed on the external device comprises information about at least one of an estimated time period for performing the operation by the external device, a time period taken to perform the operation, a time scheduled to start the operation, a time the operation starts, or a time the operation ends.

3. The electronic apparatus of claim 1, wherein the time information related to the operation currently being performed on the external device comprises at least one of information related to a time period taken for the external device to download an application or content, information related to a time period taken for the external device to install the application, information related to a time period taken for the external device to reproduce the content, information related to a time scheduled to turn on or off power of the external device, or information related to a time at which the external device performs a call function.

4. The electronic apparatus of claim 1,
    wherein each of the plurality of partial areas indicates a time unit, and
    wherein the at least one processor is further configured to:
        determine a partial area corresponding to a current time from among the plurality of partial areas, and
        generate the clock GUI on which the indication object indicates the area that is distant from the partial area corresponding to the current time by a distance corresponding to the time information.

5. The electronic apparatus of claim 1,
    wherein each of the plurality of partial areas indicates a time unit,
    wherein the at least one processor is further configured to generate the clock GUI on which the indication object indicates an area that is distant from a reference line by a distance corresponding to the time information, and
    wherein the reference line corresponds to a boundary line between two partial areas comprised in the plurality of partial areas.

6. The electronic apparatus of claim 1, wherein the display is further configured to display a control GUI for controlling the external device.

7. The electronic apparatus of claim 6, wherein the control GUI comprises at least one of a GUI for controlling the external device to start performing the operation, a GUI for controlling the external device to pause the performing of the operation, or a GUI for controlling the external device to end the performing of the operation.

8. The electronic apparatus of claim 1,
    wherein the display is further configured to display the clock GUI, in response to the input of selecting the external device.

9. The electronic apparatus of claim 1, further comprising:
    an inputter configured to receive a user input,
    wherein the at least one processor is further configured to:
        change the time information related to the operation of the external device, based on a user input of moving the indication object by a predetermined distance, and
        control the transceiver to transmit the changed time information to the external device, and
    wherein the display is further configured to display the indication object at a position moved by the predetermined distance.

10. The electronic apparatus of claim 1, wherein the clock GUI further comprises a visual representation of the external device, and the visual representation of the external device is displayed at the center point.

11. The electronic apparatus of claim 1, wherein the indication object rotates counterclockwise toward an end object of the indication area.

12. A method, performed by an electronic apparatus, of displaying time information related to an operation of an external device, the method comprising:
    receiving a user input, from a user, an input of selecting the external device from a list of a plurality of external devices;
    displaying the list of the plurality of external devices connected to the electronic apparatus;
    obtaining time information related to an operation of the external device; and
    displaying the time information on a clock graphical user interface (GUI),
    wherein the clock GUI comprises an indication area and an indication object moving on the indication area, and wherein the indication object rotates with respect to a center point included in the indication area, the indication object indicates the time information by indicating an area from among a plurality of partial areas included in the indication area, and the indication object further indicates a decrease in a time related to the operation currently being performed on the external device by rotating in a counterclockwise direction according to a flow of time.

13. The method of claim 12, wherein the time information related to the operation currently being performed on the external device comprises information about at least one of an estimated time period for performing the operation by the external device, a time period taken to perform the operation, a time scheduled to start the operation, a time the operation starts, or a time the operation ends.

14. The method of claim 12, wherein the time information related to the operation currently being performed on the external device comprises at least one of information related to a time period taken for the external device to download an application or content, information related to a time period taken for the external device to install the application, information related to a time period taken for the external device to reproduce the content, information related to a time scheduled to turn on or off power of the external device, or information related to a time at which the external device performs a call function.

15. The method of claim 12,
wherein each of the plurality of partial areas indicates a time unit, and
wherein the method further comprises:
determining a partial area corresponding to a current time from among the plurality of partial areas; and
generating the clock GUI on which the indication object indicates an area that is distant from the partial area corresponding to the current time by a distance corresponding to the time information.

16. The method of claim 12,
wherein each of the plurality of partial areas indicates a time unit,
wherein the method further comprises generating the clock GUI on which the indication object indicates an area that is distant from a reference line by a distance corresponding to the time information, and
wherein the reference line corresponds to a boundary line between two partial areas comprised in the plurality of partial areas.

17. The method of claim 12, further comprising:
displaying a control GUI for controlling the external device.

18. The method of claim 17, wherein the control GUI comprises at least one of a GUI for controlling the external device to start performing the operation, a GUI for controlling the external device to pause the performing of the operation, or a GUI for controlling the external device to end the performing of the operation.

19. The method of claim 12, further comprising:
displaying the clock GUI, in response to the input of selecting the external device.

20. The method of claim 12, further comprising:
receiving a user input;
changing the time information related to the operation of the external device, based on the user input of moving the indication object by a predetermined distance;
controlling to transmit the changed time information to the external device; and
displaying the indication object at a position moved by the predetermined distance.

21. A non-transitory computer-readable recording medium having recorded thereon at least one program configured to be executed by at least one processor, the at least one program comprising instructions for:
receiving a user input, from a user, an input of selecting an external device from a list of a plurality of external devices;
displaying the list of the plurality of external devices connected to an electronic apparatus;
obtaining time information related to an operation of an external device; and
displaying the time information on a clock graphical user interface (GUI),
wherein the clock GUI comprises an indication area and an indication object moving on the indication area, and
wherein the indication object rotates with respect to a center point included in the indication area, the indication object indicates the time information by indicating an area from among a plurality of partial areas included in the indication area, and the indication object further indicates a decrease in a time related to the operation currently being performed on the external device by rotating in a counterclockwise direction according to a flow of time.

22. The non-transitory computer-readable recording medium of claim 21, wherein the time information related to the operation currently being performed on the external device comprises information about at least one of an estimated time period for performing the operation by the external device, a time period taken to perform the operation, a time scheduled to start the operation, a time the operation starts, or a time the operation ends.

* * * * *